United States Patent
Mathur

(10) Patent No.: US 11,860,847 B2
(45) Date of Patent: *Jan. 2, 2024

(54) EFFICIENT PRODUCTION AND CONSUMPTION FOR DATA CHANGES IN A DATABASE UNDER HIGH CONCURRENCY

(71) Applicant: salesforce.com, inc., San Francisco, CA (US)

(72) Inventor: Rohitashva Mathur, Walnut Creek, CA (US)

(73) Assignee: Salesforce, Inc., San Francisco, CA (US)

(*) Notice: Subject to any disclaimer, the term of this patent is extended or adjusted under 35 U.S.C. 154(b) by 392 days.

This patent is subject to a terminal disclaimer.

(21) Appl. No.: 17/111,039

(22) Filed: Dec. 3, 2020

(65) Prior Publication Data

US 2021/0117400 A1  Apr. 22, 2021

Related U.S. Application Data

(63) Continuation of application No. 16/141,496, filed on Sep. 25, 2018, now Pat. No. 10,942,909.

(51) Int. Cl.
*G06F 16/00* (2019.01)
*G06F 16/22* (2019.01)
*G06F 7/02* (2006.01)

(52) U.S. Cl.
CPC .......... *G06F 16/2282* (2019.01); *G06F 7/026* (2013.01)

(58) Field of Classification Search
CPC ............. G06F 16/2282; G06F 16/217; G06F 16/2228; G06F 16/2308; G06F 16/2358

USPC ........................................................ 707/748
See application file for complete search history.

(56) References Cited

U.S. PATENT DOCUMENTS

| | | | | | |
|---|---|---|---|---|---|
| 4,356,549 | A | * | 10/1982 | Chueh | G06F 12/1018 711/216 |
| 5,855,018 | A | * | 12/1998 | Chor | G06F 21/6245 713/180 |
| 6,006,232 | A | * | 12/1999 | Lyons | H03M 7/30 |
| 6,067,639 | A | * | 5/2000 | Rodrigues | G06F 11/3688 717/124 |
| 6,121,533 | A | * | 9/2000 | Kay | G10H 1/0091 84/DIG. 12 |
| 6,138,112 | A | * | 10/2000 | Slutz | G06F 11/3672 717/124 |
| 6,314,421 | B1 | * | 11/2001 | Sharnoff | G06F 16/3346 707/999.005 |

(Continued)

OTHER PUBLICATIONS

U.S. Appl. No. 16/141,496, Notice of Allowance dated Nov. 5, 2020.

*Primary Examiner* — Albert M Phillips, III
*Assistant Examiner* — Rezwanul Mahmood

(57) ABSTRACT

A seed value assigned to a database table is determined. Numerically ordered invocation numbers are determined. Unordered pseudorandom numbers are generated based on the seed value and the invocation numbers to index temporally ordered data changes to the database table. It is determined whether the total number of yet-to-be-saved pseudorandom numbers reaches a maximum total number threshold. If so, the yet-to-be-saved pseudorandom numbers and a sequence of corresponding invocation numbers are saved in a sync table.

20 Claims, 11 Drawing Sheets

(56) References Cited

U.S. PATENT DOCUMENTS

| | | | | |
|---|---|---|---|---|
| 6,374,336 B1* | 4/2002 | Peters | ............... | H04N 21/2315 |
| | | | | 714/E11.034 |
| 6,415,373 B1* | 7/2002 | Peters | ............... | G06F 16/70 |
| | | | | 714/E11.034 |
| 6,553,347 B1* | 4/2003 | Tavor | ............... | G06Q 30/02 |
| | | | | 707/999.005 |
| 6,553,381 B2* | 4/2003 | Kondo | ............... | H04N 9/888 |
| | | | | 386/E9.059 |
| 7,234,093 B2* | 6/2007 | Kadkade | ............... | G06F 30/3323 |
| | | | | 714/741 |
| 7,508,935 B2* | 3/2009 | Oommen | ............... | H04L 9/0836 |
| | | | | 380/37 |
| 7,512,956 B1* | 3/2009 | Nicholes | ............... | G06F 9/455 |
| | | | | 719/330 |
| 7,523,111 B2* | 4/2009 | Walmsley | ............... | B41J 2/04586 |
| | | | | 707/999.009 |
| 7,792,986 B2* | 9/2010 | Donoho | ............... | H04L 67/53 |
| | | | | 709/224 |
| 7,853,600 B2* | 12/2010 | Herz | ............... | H04N 7/14 |
| | | | | 707/751 |
| 7,953,723 B1* | 5/2011 | Dutton | ............... | G06F 16/3346 |
| | | | | 707/707 |
| 8,260,769 B1* | 9/2012 | Fuller | ............... | G06F 16/335 |
| | | | | 707/715 |
| 3,301,623 A1 | 10/2012 | Chakrabarti et al. | | |
| 8,301,623 B2* | 10/2012 | Chakrabarti | ............... | G06F 16/9535 |
| | | | | 707/723 |
| 8,538,886 B1* | 9/2013 | Iu | ............... | G06T 1/005 |
| | | | | 380/252 |
| 8,560,553 B2* | 10/2013 | Bentley | ............... | G06F 16/4387 |
| | | | | 707/916 |
| 8,588,347 B1* | 11/2013 | Petrovic | ............... | H04B 7/0891 |
| | | | | 375/340 |
| 8,639,630 B2* | 1/2014 | Fomenko | ............... | H04L 67/104 |
| | | | | 705/79 |
| 8,696,429 B1* | 4/2014 | White | ............... | G07F 17/3293 |
| | | | | 463/16 |
| 8,713,026 B2* | 4/2014 | Spence | ............... | G06F 16/4387 |
| | | | | 707/748 |
| 8,756,264 B2* | 6/2014 | Sussman | ............... | G06F 7/582 |
| | | | | 708/256 |
| 8,930,712 B1* | 1/2015 | Chou | ............... | G06F 21/6245 |
| | | | | 380/46 |
| 8,972,379 B1* | 3/2015 | Grieselhuber | ............... | G06F 16/951 |
| | | | | 707/795 |
| 8,978,152 B1* | 3/2015 | Rozenberg | ............... | H04L 63/0428 |
| | | | | 726/26 |
| 9,008,303 B1* | 4/2015 | Juels | ............... | H04L 9/0891 |
| | | | | 380/46 |
| 9,027,099 B1* | 5/2015 | Saylor | ............... | G06F 16/5854 |
| | | | | 713/168 |
| 9,083,515 B1* | 7/2015 | van Dijk | ............... | H04L 9/005 |
| 9,092,447 B1* | 7/2015 | Anderson | ............... | G06Q 30/0185 |
| 9,189,904 B1* | 11/2015 | Diorio | ............... | G08B 13/2454 |
| 9,317,221 B2* | 4/2016 | Ishikawa | ............... | G06F 16/1827 |
| 9,342,705 B1* | 5/2016 | Schneider | ............... | H04L 9/0822 |
| 9,363,221 B1* | 6/2016 | Ozog | ............... | H04L 67/306 |
| 9,880,929 B2* | 1/2018 | Roesch | ............... | G09C 1/00 |
| 9,910,999 B1* | 3/2018 | Yu | ............... | G06F 21/6254 |
| 10,078,968 B2* | 9/2018 | Lowry | ............... | G09B 7/07 |
| 10,209,960 B1* | 2/2019 | Packes, Jr | ............... | G06F 16/9537 |
| 10,268,726 B1* | 4/2019 | Schiesser | ............... | G06F 16/22 |
| 10,275,611 B1* | 4/2019 | Yu | ............... | G06F 16/33 |
| 10,394,789 B1* | 8/2019 | Animesh | ............... | G06F 16/2282 |
| 10,404,458 B1* | 9/2019 | Yamada | ............... | H04L 9/0852 |
| 10,412,068 B2* | 9/2019 | Peddada | ............... | H04L 63/10 |
| 10,514,893 B1* | 12/2019 | Vakili | ............... | G06F 7/582 |
| 10,594,685 B2* | 3/2020 | Peddada | ............... | G06F 21/31 |
| 10,740,474 B1* | 8/2020 | Ghetti | ............... | H04L 9/321 |
| 10,942,909 B2* | 3/2021 | Mathur | ............... | G06F 16/2358 |
| 10,997,070 B1* | 5/2021 | Eisenhuth | ............... | G06F 12/04 |
| 2002/0013794 A1* | 1/2002 | Carro | ............... | H04L 9/0662 |
| | | | | 715/205 |
| 2002/0138554 A1* | 9/2002 | Feigen | ............... | H04L 63/123 |
| | | | | 709/220 |
| 2002/0147707 A1* | 10/2002 | Kraay | ............... | G06F 16/90344 |
| 2002/0199060 A1* | 12/2002 | Peters | ............... | H04N 7/17336 |
| | | | | 714/E11.034 |
| 2003/0220927 A1* | 11/2003 | Iverson | ............... | G06F 21/6254 |
| 2004/0199533 A1* | 10/2004 | Celis | ............... | G06F 16/2255 |
| 2004/0223608 A1* | 11/2004 | Oommen | ............... | H04L 9/0656 |
| | | | | 380/28 |
| 2005/0050122 A1* | 3/2005 | Blumenthal | ............... | G06F 7/582 |
| | | | | 708/250 |
| 2006/0013395 A1* | 1/2006 | Brundage | ............... | H04N 1/32272 |
| | | | | 380/255 |
| 2006/0020578 A1* | 1/2006 | Hood | ............... | G06F 9/4493 |
| 2006/0085651 A1* | 4/2006 | Staddon | ............... | H04L 9/3218 |
| | | | | 713/193 |
| 2006/0112112 A1* | 5/2006 | Margolus | ............... | G06F 16/9014 |
| 2006/0247533 A1* | 11/2006 | Abe | ............... | G06T 7/97 |
| | | | | 600/476 |
| 2007/0204162 A1* | 8/2007 | Rodriguez | ............... | H04L 9/0872 |
| | | | | 713/176 |
| 2008/0095371 A1* | 4/2008 | Vataja | ............... | H04L 63/061 |
| | | | | 380/278 |
| 2008/0140700 A1* | 6/2008 | Carpentier | ............... | G06F 16/34 |
| | | | | 707/E17.093 |
| 2008/0199004 A1* | 8/2008 | Mantin | ............... | G06F 21/74 |
| | | | | 380/42 |
| 2008/0209226 A1* | 8/2008 | Venkatesan | ............... | H04L 9/3231 |
| | | | | 713/186 |
| 2008/0209227 A1* | 8/2008 | Venkatesan | ............... | H04L 9/3236 |
| | | | | 713/186 |
| 2009/0070361 A1* | 3/2009 | Haber | ............... | G06F 21/6254 |
| | | | | 707/999.102 |
| 2009/0147828 A1* | 6/2009 | Palanki | ............... | H04L 1/0625 |
| | | | | 375/E1.001 |
| 2009/0149208 A1* | 6/2009 | Huttunen | ............... | H04W 24/10 |
| | | | | 455/67.11 |
| 2009/0320537 A1* | 12/2009 | Alexander | ............... | E05B 67/24 |
| | | | | 340/5.2 |
| 2009/0323942 A1* | 12/2009 | Sharon | ............... | G11C 16/3427 |
| | | | | 380/28 |
| 2009/0323972 A1* | 12/2009 | Kohno | ............... | H04L 9/0631 |
| | | | | 380/284 |
| 2010/0046443 A1* | 2/2010 | Jia | ............... | H04W 76/11 |
| | | | | 368/10 |
| 2010/0070549 A1* | 3/2010 | Nagaraj | ............... | G06F 7/588 |
| | | | | 708/254 |
| 2010/0098318 A1* | 4/2010 | Anderson | ............... | G06V 30/2253 |
| | | | | 705/64 |
| 2010/0129000 A1* | 5/2010 | Strom | ............... | G06T 9/00 |
| | | | | 382/253 |
| 2010/0131573 A1* | 5/2010 | Reese | ............... | G06F 16/285 |
| | | | | 715/780 |
| 2010/0211787 A1* | 8/2010 | Bukshpun | ............... | H04L 9/14 |
| | | | | 380/255 |
| 2010/0281331 A1* | 11/2010 | Hammons, Jr. | ............... | H04L 1/1829 |
| | | | | 710/52 |
| 2010/0312775 A1* | 12/2010 | Haas | ............... | G06F 16/2462 |
| | | | | 707/769 |
| 2011/0078152 A1* | 3/2011 | Forman | ............... | G06F 16/325 |
| | | | | 707/E17.058 |
| 2011/0320184 A1* | 12/2011 | Beyer | ............... | G06F 16/24568 |
| | | | | 703/22 |
| 2012/0143885 A1* | 6/2012 | Talpes | ............... | G06F 9/384 |
| | | | | 707/756 |
| 2012/0179735 A1* | 7/2012 | Ferguson | ............... | G06F 7/58 |
| | | | | 708/254 |
| 2012/0224691 A1* | 9/2012 | Purohit | ............... | H04L 5/06 |
| | | | | 380/255 |
| 2012/0242518 A1* | 9/2012 | Martin | ............... | H03M 13/2782 |
| | | | | 341/81 |
| 2012/0317124 A1* | 12/2012 | Butcher | ............... | G06F 16/278 |
| | | | | 707/E17.084 |
| 2012/0323926 A1* | 12/2012 | Nath | ............... | G06F 16/2462 |
| | | | | 707/758 |

(56) References Cited

U.S. PATENT DOCUMENTS

| | | | |
|---|---|---|---|
| 2012/0330769 A1* | 12/2012 | Arceo | G06Q 20/4014 455/411 |
| 2013/0031104 A1* | 1/2013 | Gopinath | G06F 16/338 707/736 |
| 2013/0091350 A1* | 4/2013 | Gluck | G06F 16/9535 713/153 |
| 2013/0103685 A1* | 4/2013 | Preneel | G06Q 20/385 707/769 |
| 2013/0110839 A1* | 5/2013 | Kirshenbaum | G06F 16/35 707/E17.014 |
| 2013/0117264 A1* | 5/2013 | Ishikawa | G06F 16/278 707/736 |
| 2013/0204905 A1* | 8/2013 | Ioffe | H04L 9/00 707/E17.044 |
| 2013/0212075 A1* | 8/2013 | Doshi | G06F 16/2282 707/693 |
| 2013/0232341 A1* | 9/2013 | Movshovitz | G06F 16/22 713/189 |
| 2013/0246609 A1* | 9/2013 | Topchy | G06F 16/957 709/224 |
| 2013/0275386 A1* | 10/2013 | Shin | G06F 16/134 707/667 |
| 2013/0336320 A1* | 12/2013 | Rangaraman | H04L 45/38 370/392 |
| 2014/0016772 A1* | 1/2014 | Yajima | H04L 9/0816 380/28 |
| 2014/0032964 A1* | 1/2014 | Neerincx | H04L 69/40 707/634 |
| 2014/0095526 A1* | 4/2014 | Harada | G06F 7/582 707/E17.075 |
| 2014/0108424 A1* | 4/2014 | Casella dos Santos | G06F 16/288 707/769 |
| 2014/0136557 A1* | 5/2014 | Lilienthal | G06F 7/58 707/754 |
| 2014/0222770 A1* | 8/2014 | Lad | G06F 16/2365 707/692 |
| 2014/0241337 A1* | 8/2014 | Marsh | H04W 56/00 370/350 |
| 2014/0282940 A1* | 9/2014 | Williams | H04L 63/0807 726/6 |
| 2014/0317055 A1* | 10/2014 | Agrawal | G06F 16/273 707/627 |
| 2014/0344944 A1* | 11/2014 | Olumofin | G06F 21/6245 726/26 |
| 2014/0379763 A1* | 12/2014 | Jain | G06F 21/6218 707/812 |
| 2015/0032496 A1* | 1/2015 | McConnell | G06Q 10/06393 705/7.25 |
| 2015/0052603 A1* | 2/2015 | Morgan | H04L 63/1408 726/22 |
| 2015/0063350 A1* | 3/2015 | Sundaram | H04L 45/74 370/389 |
| 2015/0066881 A1* | 3/2015 | Sundaram | H04L 43/062 707/693 |
| 2015/0074063 A1* | 3/2015 | Hugg | G06F 16/2365 707/690 |
| 2015/0095252 A1* | 4/2015 | Mattsson | G06F 16/258 705/325 |
| 2015/0095389 A1* | 4/2015 | Steele | G06F 9/46 708/250 |
| 2015/0096038 A1* | 4/2015 | Mattsson | H04L 9/0637 726/26 |
| 2015/0096040 A1* | 4/2015 | Mattsson | G06F 21/64 726/26 |
| 2015/0199404 A1* | 7/2015 | Elias | G06F 16/2453 707/718 |
| 2015/0278309 A1* | 10/2015 | Harada | G06F 7/58 707/718 |
| 2016/0012444 A1* | 1/2016 | Adams | G06Q 20/401 705/41 |
| 2016/0055191 A1* | 2/2016 | Joshi | G06F 16/256 707/744 |
| 2016/0063021 A1* | 3/2016 | Morgan | G06F 16/182 707/754 |
| 2016/0070917 A1* | 3/2016 | Rozenberg | G06F 21/6254 726/26 |
| 2016/0098198 A1* | 4/2016 | Bosshart | G06F 3/064 711/154 |
| 2016/0124983 A1* | 5/2016 | Kelly | H04L 9/0869 707/693 |
| 2016/0140179 A1* | 5/2016 | Yuen | G06F 16/2455 707/769 |
| 2016/0180097 A1* | 6/2016 | Estehghari | H04L 9/0866 713/189 |
| 2016/0248583 A1* | 8/2016 | McClanahan | G06F 21/78 |
| 2016/0285631 A1* | 9/2016 | Deleeuw | G06F 7/582 |
| 2016/0350555 A1* | 12/2016 | Deleeuw | G06F 16/9535 |
| 2017/0034167 A1* | 2/2017 | Figueira | H04L 63/061 |
| 2017/0169293 A1* | 6/2017 | Valsesia | G06F 16/5838 |
| 2017/0205810 A1* | 7/2017 | Ishikawa | G06F 16/24578 |
| 2017/0277906 A1* | 9/2017 | Camenisch | G06F 21/6227 |
| 2017/0288858 A1* | 10/2017 | Hirano | H04L 9/0618 |
| 2017/0324555 A1* | 11/2017 | Wu | H04L 9/0869 |
| 2017/0353302 A1* | 12/2017 | Fernandez | H04L 1/0075 |
| 2017/0357496 A1* | 12/2017 | Smith | H04L 9/0662 |
| 2018/0052894 A1* | 2/2018 | Eide | H04L 9/0662 |
| 2018/0074791 A1* | 3/2018 | Atsumi | G06F 7/584 |
| 2018/0081827 A1* | 3/2018 | Admon | G06F 12/1408 |
| 2018/0083921 A1* | 3/2018 | Talamo | H04L 63/0263 |
| 2018/0121820 A1* | 5/2018 | Manasse | G06F 18/22 |
| 2018/0144369 A1* | 5/2018 | Pouliot | G08G 1/161 |
| 2018/0252797 A1* | 9/2018 | Frick | G01S 7/0234 |
| 2019/0005082 A1* | 1/2019 | Pannala | G06F 16/2322 |
| 2019/0018961 A1* | 1/2019 | Kostyushko | H04L 9/002 |
| 2019/0020629 A1* | 1/2019 | Baird, III | H04L 9/3066 |
| 2019/0066391 A1* | 2/2019 | Anderson | G06T 19/20 |
| 2019/0102427 A1* | 4/2019 | Chakkappen | G06F 16/2386 |
| 2019/0104169 A1* | 4/2019 | Wu | H04L 69/22 |
| 2019/0116046 A1* | 4/2019 | Hoyer | H04L 9/0643 |
| 2019/0167902 A1* | 6/2019 | Kamen | A61M 5/14244 |
| 2019/0213235 A1* | 7/2019 | Baltieri | G06F 17/18 |
| 2019/0220396 A1* | 7/2019 | Lin | G06F 12/1009 |
| 2019/0266215 A1* | 8/2019 | Kantor | G06Q 10/00 |
| 2019/0318117 A1* | 10/2019 | Beecham | G06F 16/9024 |
| 2019/0325082 A1* | 10/2019 | Laine | G06F 16/901 |
| 2019/0334727 A1* | 10/2019 | Kaufman | H04L 9/3242 |
| 2019/0349368 A1* | 11/2019 | Hegde | H04W 12/06 |
| 2019/0370381 A1* | 12/2019 | Klein | G06F 16/182 |
| 2019/0372924 A1* | 12/2019 | Waltz | G06F 16/2282 |
| 2020/0045025 A1* | 2/2020 | Toofan | H04L 63/08 |
| 2020/0092283 A1* | 3/2020 | Parkinson | G06F 21/44 |
| 2020/0097575 A1* | 3/2020 | Mathur | G06F 16/2358 |
| 2020/0159779 A1* | 5/2020 | Dong | H04L 9/0643 |
| 2020/0159936 A1* | 5/2020 | Anderson | G06T 19/20 |
| 2020/0228515 A1* | 7/2020 | Hassan | H04L 9/3226 |
| 2020/0242104 A1* | 7/2020 | Persson | G06F 16/2379 |
| 2020/0242132 A1* | 7/2020 | Persson | G06F 16/278 |
| 2020/0264958 A1* | 8/2020 | Blass | G06F 21/6227 |
| 2021/0117400 A1* | 4/2021 | Mathur | G06F 16/2308 |
| 2021/0336937 A1* | 10/2021 | Gao | H04L 67/02 |
| 2022/0173953 A1* | 6/2022 | Li | H04J 11/005 |
| 2022/0362467 A1* | 11/2022 | Kamen | G16H 20/17 |
| 2023/0023060 A1* | 1/2023 | Davies | H04L 9/50 |
| 2023/0033600 A1* | 2/2023 | Nelson | H04L 9/3236 |

* cited by examiner

PersonTable 1

| Name | Description | System Time |
|------|-------------|-------------|
| A1 | D1 | t1 |
| A2 | D2 | t2 |
| A3 | D3 | t3 |

FIG. 2A

PersonTable 2

| Name | Description | Sequence Number |
|------|-------------|-----------------|
| A1 | D1 | seq1 |
| A2 | D2 | seq2 |
| A3 | D3 | seq3 |

FIG. 2B

PersonTable 3

| Name | Description | PseudoRandomNumber |
|------|-------------|--------------------|
| A1 | D1 | prn1 |
| A2 | D2 | prn2 |
| A3 | D3 | prn3 |
|  |  |  |
|  |  |  |
|  |  |  |
|  |  |  |
|  |  |  |
|  |  |  |

FIG. 2C

PersonTable 4

| Name | Description | PseudoRandomNumber | System Timestamp |
|------|-------------|--------------------|------------------|
| A1 | D1 | prn1 | t1 |
| A2 | D2 | prn2 | t2 |
| A3 | D3 | prn3 | t3 |
|  |  |  |  |
|  |  |  |  |
|  |  |  |  |
|  |  |  |  |
|  |  |  |  |
|  |  |  |  |

FIG. 2D

EFFICIENT PRODUCTION AND CONSUMPTION FOR DATA CHANGES IN A DATABASE UNDER HIGH CONCURRENCY

CROSS-REFERENCE TO RELATED APPLICATIONS

This application is a Continuation of U.S. patent application Ser. No. 16/141,496 filed on Sep. 25, 2018, the contents of which are incorporated herein by reference in their entireties. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates generally to databases and database applications, and in particular, to efficient production and consumption for data changes in a database under high concurrency.

BACKGROUND

A large-scale cloud-based multitenant computing system may include multiple datacenters at various geographic locations to maintain millions of sets of application data for millions of organizations as well as provide millions of sets of application services such as those for customer relationship management (CRM), secured data access, online transaction processing, mobile apps, etc., to respective users and/or customers of these organizations.

Numerous applications and/or services in the multitenant computing system may attempt to create, update, delete and/or retrieve up-to-date data changes to database tables such as an Accounts table frequently on an ongoing basis. Underlying database accesses for these data manipulation and query operations may use B-tree indexes based on system timestamps contemporaneously generated with the data changes to the data tables.

Hot block problems can occur as the applications and/or services may end up concurrently requesting accesses to the same last blocks of the same B-tree indexes storing index entries or pointers to the latest data changes. Significant contentions and overload conditions on the same last blocks of the same B-tree indexes can cause database service/access capabilities in the system to experience a non-linear (e.g., exponential, etc.) deterioration much worse than a linear deterioration scalable to the number of access requests. This is because many of the concurrent access requests to the same last blocks of the same indexes could frequently experience repeated time-outs, retries and even errors/failures under the overload conditions, thereby continually exacerbating the already existing contentions and overload conditions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 2A through FIG. 2D illustrate example database tables;

DESCRIPTION OF EXAMPLE EMBODIMENTS

Figure 1A:
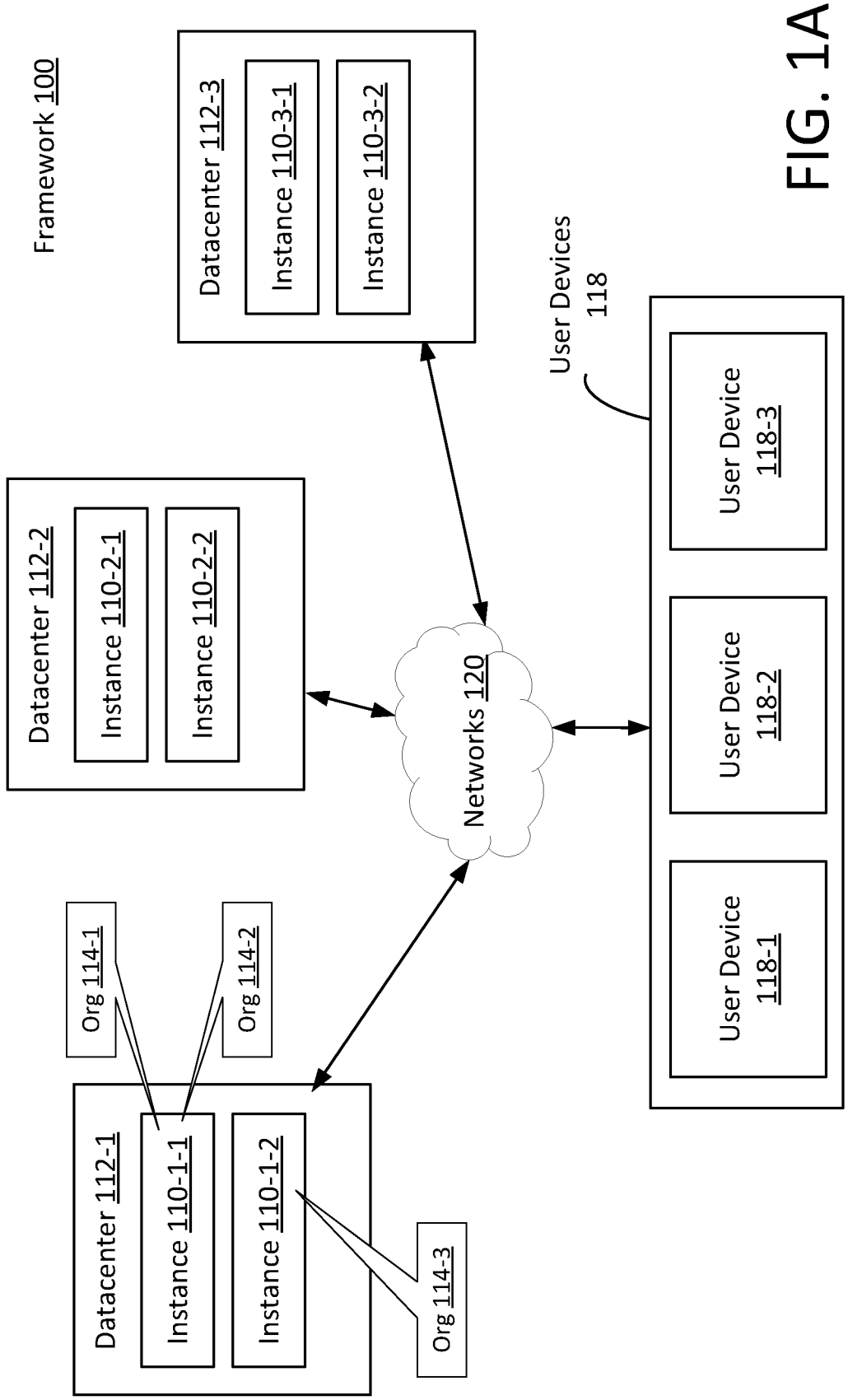
FIG. 1A illustrates an example overall data change production and consumption framework.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:
   1.0. General Overview
   2.0. Functional Overview
      2.1 PRN Generation and Data Change Production/Consumption
      2.2 Example System Configuration(s)
      2.3 Indexes for Data Change Production and Consumption
      2.4 Time Sequences of Invocation Numbers and PRNs
   3.0. Example Embodiments
   4.0 Implementation Mechanism—Hardware Overview
   5.0. Extensions and Alternatives

1.0 General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

It is quite common for applications (e.g., client applications, desktop computer applications, mobile applications, etc.) to be interested in detecting data changes, made during a given time, to data values maintained in a database (or database tables therein), and accessing these changed values and attendant information, possibly as some function of the order in which these values changed.

To do so, an index may be created based on system timestamps of the data changes. As a data change consumer of a database table (e.g., a Person table, an Accounts table, etc.), an application can find out all the data changes that have happened in a given time interval (e.g., t1→t3, where t1 and t3 are respectively beginning time and end time of the given time interval, etc.) by querying against this index for this interval.

Similarly, an index may be created based on monotonically increasing (or decreasing) sequence numbers assigned to the changes. An application can find out all the changes that have happened in a given sequence number range (e.g., seq1→seq3, where seq1 and seq3 are respectively beginning and ending sequence numbers of the given sequence number range, etc.) by querying against this index for this range (which may be translated to or from a time interval corresponding to the sequence number range in some implementation examples).

While these approaches seem simple and logically sound, they suffer from serious scalability issues as well as performance issues due to significant contentions and overload conditions in connection with the system-timestamp-based indexes and/or sequence-number-based indexes.

Databases (e.g., Oracle, Postgres/Sayonara, etc.) often implement indexes using B-trees or a variation thereof. A B-tree index can easily run into hot block issues. Most if not all write accesses as well as many read accesses to a system-timestamp-based index or a sequence-number-based index goes to the last block of the index where the latest keys (and last processed index entries) such as the latest system timestamps or the latest sequence numbers are concentrated.

Data change consumers cause read accesses—and even write accesses if the data change consumers dequeue or remove the latest data changes after data change retrievals/consumption—to the last block of the index, as these applications tend to retrieve or consume the latest data changes to the database table in order to update other application code of these latest data changes.

Similarly, data change producers cause write accesses to the last block of the index, as system timestamps or sequence numbers are monotonically increasing or decreasing values over time and the latest data changes tend to concentrate in the last block.

In operational scenarios in which frequent write and read accesses are made to the database table by these various data change consumers and producers, significant contention and overload condition can happen quickly on the rightmost block of the B-tree system-timestamp-based or sequence-number-based index of the database table. The contention and overload condition can exert a non-linear (e.g., exponential, etc.) impact on database access capabilities, as frequent repeated timeouts, retries and errors/failures occur in the overload condition. Consequently, the service rate of the entire platform (or instances thereof) deteriorates in a non-linearly (e.g., exponentially, etc.) manner. Time and cost per transaction is greatly increased. Customer experiences become seriously deteriorated or worsen.

Many other problems may also occur with these approaches. For example, system timestamps may have a precision or granularity of a time unit such as one (1) millisecond. While the use of a system-timestamp-based index does not necessarily cause data loss, such an index may cause loss of information on the exact temporal order of data changes that occur relatively close in time, for example within a time (e.g., 1 ms, etc.) distinguishable by the highest time resolution of system timestamps. More specifically, a temporal order of two or more timewise adjacent data changes may not be established/distinguished with certainty if these data changes occur inside a time unit of a maximum precision or granularity such as one (1) millisecond, as these data changes are likely labeled with the same system timestamp.

In addition, a clock on a system or device can get reset, drift, and/or be impacted by day light saving time changes. Different clocks of different systems or devices may be affected by clock resets, clock drifts, time changes, etc., differently. While a database system can use a universal time clock (UTC), other systems and devices interacting with the database system may or may not use the same clock when they interact with the database system.

Using a sequence-number-based index to access data changes of a database table may avoid some of the problems associated with a system-timestamp-based index. However, at least the last block (or "hot block") problem remains.

In contrast, techniques as described herein can be implemented to avoid scalability and/or contention pitfalls associated with other approaches under which system timestamps or sequence numbers are used as the means to identify data changes in a temporal order. Data change production and consumption as described herein is not required to rely on actual system timestamps of data change events to identify, index or access data changes, and is thus free of problems arising out of clock synchronization, lags, shifts, resets, different clock sources, different time zones, day light saving related clock changes, etc., among different component systems, processors, devices, different geographic locations, etc., for the purpose of identifying and accessing the data changes.

Instead of using system timestamps and/or sequence numbers to index data changes, pseudorandom numbers (PRNs) (or in general any numerically unordered numbers generated in a time sequential order or a temporal order) that do not observe a numeric order over time can be used to identify or index data changes made to a database table. These PRNs (or the unordered numbers) are deterministically reproducible through a PRN generator (or any unordered number generation mapping/function) using a preconfigured seed value and a time sequence of numerically ordered invocation number as input. In other words, the PRN generator—whether or not it is accessed or implemented by a data change consumer, a data change producer, etc.—can generate from a time sequence of numerically ordered numbers (e.g., numerically ordered invocation numbers, etc.) the same time sequence of pseudorandom numbers given the same seed value; the time sequence (or values sequence) may be completely unordered. It is this lack of order that prevents the last block issue or the hot index block issue as previously discussed that is associated with other approaches that do not implement techniques as described herein. The PRN generator may, but is not necessarily limited to only, be a seeded, mostly uniform, pseudo random number generator.

Using numerically unordered pseudorandom numbers to identify data changes does not prevent a data change production and consumption system as described herein from still retaining ability to access the data changes made to the database table in the temporal order or some function thereof.

A subsequence of consecutive data changes made to the database table in the temporal order can be identified or indexed (e.g., data capture code, by a data change producer operating with a PRN generator as described herein, etc.)

with a subsequence of pseudorandom numbers generated by a subsequence of numerically ordered invocation numbers (from N1 to N2) in the temporal order. To detect the same subsequence of consecutive data changes made to the database table in the temporal order, a data change consumer (e.g., operating with a PRN generator as described herein, etc.) can generate the same subsequence of pseudorandom numbers with the same subsequence of numerically ordered invocation numbers (from N1 to N2) in the temporal order, and use the same subsequence of pseudorandom numbers to access or retrieve the subsequence of consecutive data changes made to the database table in the temporal order. Example database tables may include, but are not necessarily limited to only, any of: persisted database tables, system tables, user tables, change tables, materialized query tables, materialized views, temp tables, etc. As used herein, the term "temporal order" refers to a time sequential order in which data changes are made to a database table as described herein.

One or more sync tables (e.g., consumer and producer sync tables, etc.) can be used by one or more actors in the data change production and consumption as described herein such as any, some or all of data change consumers, data change producers, PRN generators/servers. The latest or last run state can be saved into the one or more sync tables periodically or after a number of data changes have been consumed or produced.

For example, after every N invocations are made (e.g., after every N consecutive invocation numbers are used to generate corresponding N pseudorandom numbers, etc.) by a data change producer to label or index corresponding data changes made to the data table, a PRN generator operating with the data change producer can save these invocation numbers (N→M) and the corresponding pseudorandom numbers to a producer sync table.

Similarly, after every N invocations are made (e.g., after every N consecutive invocation numbers are used to generate corresponding N pseudorandom numbers, etc.) by a data change producer to retrieve or consume corresponding data changes made to the data table, a PRN generator operating with the data change consumer can save these invocation numbers (N→M) and the corresponding pseudorandom numbers to a consumer sync table.

The latest or last run state as saved in the sync tables such as the saved invocation numbers and/or the saved pseudorandom numbers can be used by data change production and consumption operations to seamlessly recover from system or process restarts, failures, (scheduled or unscheduled) shutdowns, etc.

A PRN generator operating with a data change consumer or a data change producer can reset or recover based on the latest or last run state saved in the sync table, when recovering from a system/application start (e.g., due to any reason, etc.). For example, the PRN generator can query a database to determine or retrieve a seed value for a database table upon restarting. Furthermore, the PRN generator can retrieve, from the sync tables, the last saved (or recorded) sequence or subsequence of invocation numbers (e.g., a set, a sequence, a subsequence, etc., of last recorded invocation numbers, etc.) and corresponding sequence or subsequence of pseudorandom numbers that have been used to index or to retrieve/consume corresponding data changes.

The pseudorandom numbers can be retrieved from the sync tables in the temporal order if the pseudorandom numbers are so stored there. Additionally, optionally or alternatively, the PRN generator can be invoked a number of times (e.g., N times, etc) with the last saved invocation numbers (e.g., retrieved from the sync tables, etc.) to obtain the corresponding pseudorandom numbers in the temporal order. A check can be made to determine whether the pseudorandom numbers match pseudorandom numbers of the last processed data changes in the database table.

If the sequences (or subsequences thereof) derived from the sync tables and from the last processed data changes in the database table match with each other, it may be inferred that the pseudorandom numbers derived from the sync tables and the invocation numbers used to derive these pseudorandom numbers represent the last known recorded sync state of the PRN generator. Thereafter, invocation numbers (immediately) following the invocation numbers in the sync tables can be used to generate new pseudorandom numbers for producing or consuming new data changes to the database table.

On the other hand, if the sequences derived from the sync tables and from the last processed data changes in the database table match, it may be inferred that the pseudorandom numbers derived from the sync tables and the invocation numbers used to derive these pseudorandom numbers no longer represent the last known recorded sync state of the PRN generator. The PRN generator may use an additional number (e.g., z additional entries, where z is a positive integer, etc.) of temporally/numerically ordered invocation numbers (immediately) following the invocation numbers retrieved from the sync tables to generate an additional number (z entries) of pseudorandom numbers, and use these pseudorandom numbers to query for the last processed rows in the database table to see if the additional number of pseudorandom numbers matches with pseudorandom numbers of the last processed rows in the database table.

This process can be continuously repeated until a match is found between the pseudorandom numbers starting from those generated based on the last saved invocation numbers in the sync tables and the pseudorandom numbers in the last processed rows (or row groups) in the database table.

In some embodiments, if the additionally generated pseudorandom numbers go beyond the pseudorandom numbers in the last processed rows in the database table. A binary chop algorithm, method, procedure, etc., with a logarithmic computational complexity can be used to determine or establish the last used/assigned invocation number, the last used/assigned pseudorandom number, etc., for the last processed row (or the last processed row group) in the database table.

Once such invocation number, pseudorandom number, etc., for the last processed row (or the last processed row group) in the database table is known, the data change consumer or the data change producer, which operates in conjunction with the PRN generator, can continue data change consumption and production as before.

Example PRN generator or function/mapping implemented therein may include, but are not necessarily limited to only, a function or mapping (e.g., implemented with JAVA, APEX, saved procedure, callable statement, database procedure, etc.). A PRN generator may be implemented as a part of, or a separate entity operating in conjunction with, any, some or all of: data change consumers, data change producers, a PRN server, etc. A time sequence of pseudorandom numbers generated deterministically/reproducibly by PRN generator(s) under techniques as described herein by various actors in data change production and consumption can be used to avoid time synchronization, thereby eliminating many problems associated with other approaches based on system timestamps and sequence numbers, regardless of how many these actors are and regardless of whether these actors are implemented on different systems, different devices, different processes, different threads, different instances, etc. Such a time sequence of pseudorandom numbers can be used to automatically synchronize itself among all these actors, for example without any need to perform clock synchronizations and other error-prone operations.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2.0 Functional Overview

FIG. 1A illustrates an example overall data change production and consumption framework 100. Example computing systems that implement the data change production and consumption framework (100) may include, but are not necessarily limited to: any of: a large-scale cloud-based computing system, a system with multiple datacenters, multitenant data service systems, web-based systems, systems that support massive volumes of concurrent and/or sequential transactions and interactions, database systems, and so forth. Various system constituents may be implemented through software, hardware, or a combination of software and hardware. Any, some or all of these system constituents may be interconnected and communicated directly, or through one or more networks 120.

In some embodiments, the computing system that hosts the organizations may comprise a plurality of datacenters such as 112-1, 112-2, 112-3, etc., which may be located at the same or different geographic locations such as the same or different continents, the same or different countries, the same or different states, the same or different regions, and so forth.

Each data center may implement a set of system instances to host respective organizations. These organizations may contract with the owner of the computing system such as a multi-tenant computing system to host their respective (e.g., organization-specific, organization-common, etc.) application data, to provide their (e.g., organization-specific, organization-common, etc.) application services to their respective users and/or customers. Examples of application data may include, but not necessarily limited to only, organization-specific application data, organization-common application data, application configuration data, application data, application metadata, application code, etc., specifically generated or configured for (e.g., organization-specific, organization-common, etc.) application services of an individual organization.

As used herein, the term "organization" may refer to some or all of (e.g., complete, original, a non-backup version of, a non-cached version of, an online version of, original plus one or more backup or cached copies, an online version plus one or more offline versions of, etc.) application data of an organization hosted in the computer system and application services of the organization based at least in part on the application data.

As illustrated in FIG. 1A, each datacenter (e.g., 112-1, 112-2, 112-3, etc.) may comprise a set of one or more system instances. A first datacenter 112-1 comprises first system instances 110-1-1, 110-1-2, etc.; a second datacenter 112-2 comprises second system instances 110-2-1, 110-2-2, etc.; a third datacenter 112-3 comprises third system instances 110-3-1, 110-3-2, etc.

Each system instance (e.g., 110-1-1, 110-1-2, 110-2-1, 110-2-2, 110-3-1, 110-3-2, etc.) in the hosting computing system can host up to a maximum number of organizations such as 5,000 organizations, 10,000 organizations, 15,000+ organizations, etc. As illustrated in FIG. 1A, the system instance (110-1-1) in the datacenter (112-1) may host a first organization 114-1 and a second organization 114-2, among others; the system instance (110-1-2) in the datacenter (112-1) may host a third organization 114-3, among others.

The multitenant computing system may comprise application servers and database servers in system instances for processing data access/service operations related to application services invoked by user applications running on user devices 118 (and/or other data manipulation operations and/or queries originated elsewhere) including but not limited to a first user device 118-1, a second user device 118-2, a third user device 118-3, and so forth. These data access/service operations may be serviced by the application servers operating in conjunction with the database servers. The data access/service operations may cause data changes to be made (e.g., persistently, etc.) to standard and/or custom objects maintained by the system instances for one or more organizations in the plurality of organizations hosted in the multitenant computing system. Additionally, optionally or alternatively, the data access/service operations may cause the (e.g., persistent, etc.) data changes made to the standard and/or custom objects to be consumed by data change consumers, for example for the purpose of propagating the data changes to some or all of the user applications running on the user devices (118).

2.1 PRN Generation and Data Change Production/Consumption

Figure 1B:
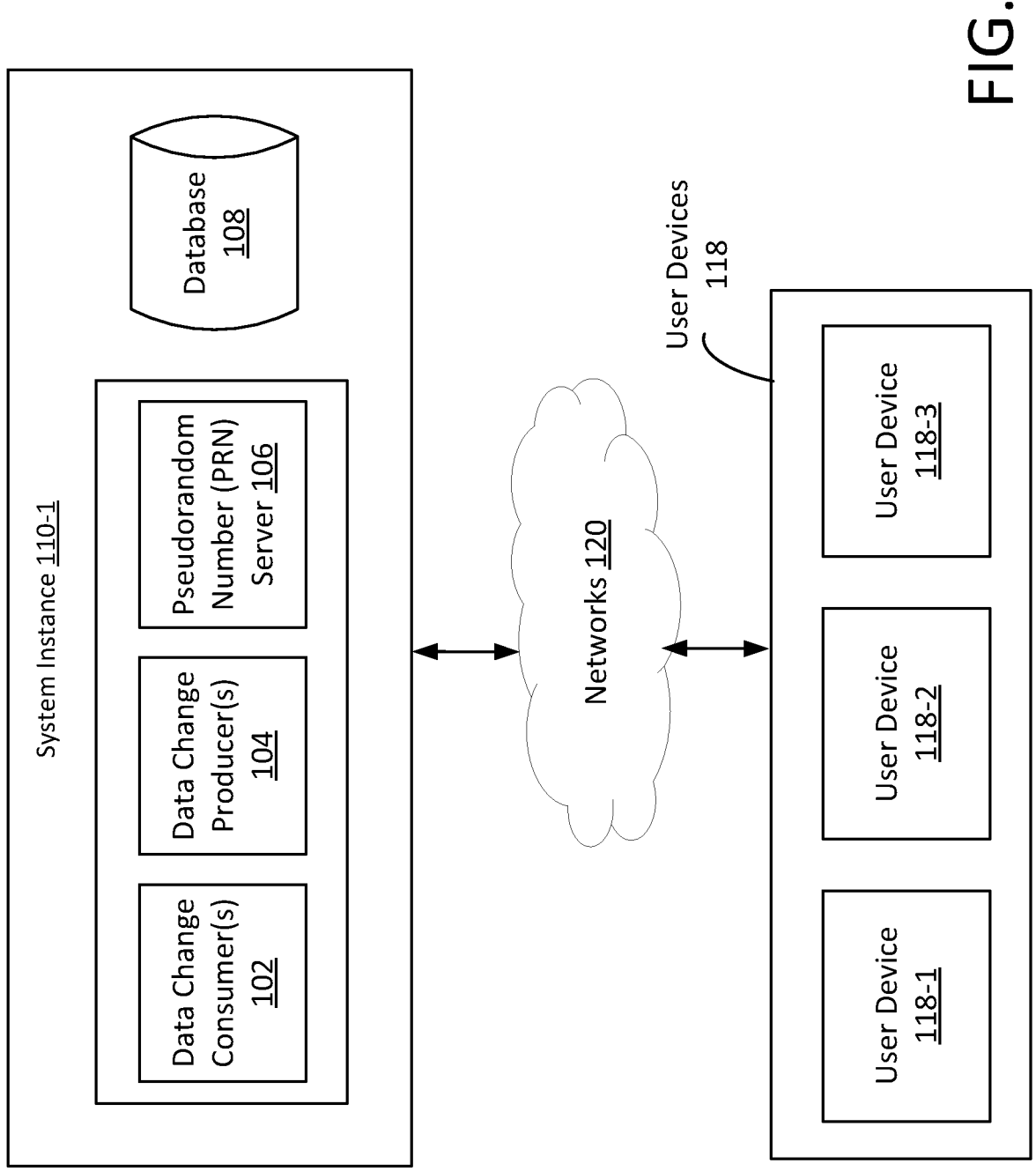
FIG. 1B illustrates an example system configuration for data change production and consumption.

FIG. 1B illustrates an example system configuration for data change production and consumption in the multitenant computing system. In some embodiments, a system instance (e.g., 110-1, etc.) may comprise one or more data change consumers 102, one or more data change producers 104, a pseudorandom number (PRN) server 106, etc. Various system constituents as illustrated in FIG. 1B may be implemented through software, hardware, or a combination of software and hardware. Any, some or all of these system constituents may be interconnected and communicated directly, or through one or more networks (e.g., 120, etc.).

In some embodiments, a single server such as a database server, a database engine, and so forth, may implement some or all of the data change consumers (102), the data change producers (104), the pseudorandom number (PRN) server (106), etc.

In some embodiments, two or more servers such as a database server and an application server operating with the database server, and so forth, may collectively (e.g., in combination, etc.) implement some or all of the data change consumers (102), the data change producers (104), the pseudorandom number (PRN) server (106), etc.

By way of example but not limitation, one or more first servers may implement one or more instances of the data change consumers (102), whereas one or more second servers may implement one or more instances of combinations of the data change producers (104) and the PRN server (106).

In some embodiments, some or all of the data change consumers (102) and the data change producers (104) may interact with user applications (e.g., desktop applications, mobile apps, etc.) running on the user devices (118), platform applications of the multitenant computing system, external (e.g., cloud-based, etc.) applications running on external (e.g., cloud-based, etc.) systems outside the multi-tenant computing system, etc. Some of these interactions cause the data change producers (104) to make time-ordered data changes to database tables maintained with a database 108. Some of all of these data changes may be made according to one or more schedules, on demand, periodically, and so forth. Some of these interactions cause the data change consumers (102) to query or consume some or all of the data changes made by the data change producers (104) to the database tables maintained with the database (108). Some of all of these data changes may be queried or consumed according to one or more schedules, on demand, periodically, and so forth.

2.2 Example System Configuration(s)

Figure 1C:
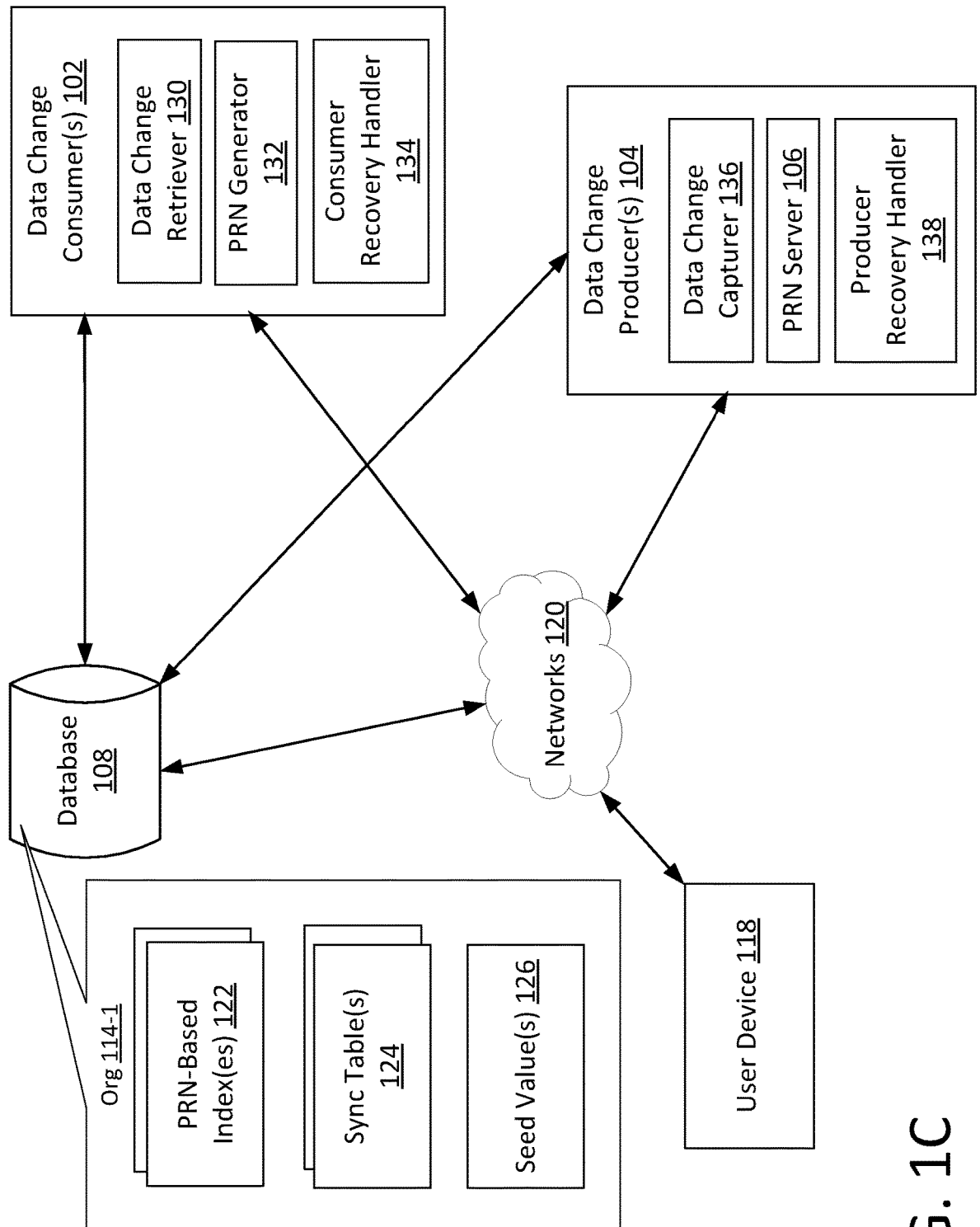
FIG. 1C illustrates example data change production and consumption.

FIG. 1C illustrates example data change production and consumption in the multitenant computing system. Various system constituents as illustrated in FIG. 1C may be implemented through software, hardware, or a combination of software and hardware. Any, some or all of these system constituents may be interconnected and communicated directly, or through one or more networks (e.g., 120, etc.).

In some embodiments, a database (e.g., 108, etc.) in a system instance (e.g., 110-1, etc.) of the multitenant computing system may store database tables for an organization (e.g., 114-1, etc.).

In some embodiments, one or more data change consumers (e.g., 102, etc.) may comprise (e.g., one or more respective instances of, etc.) a data change retriever 130, a PRN generator 132, a data change consumer recovery handler 134, etc.

The data change retriever (130) may be implemented through software, hardware or a combination thereof. The data change retriever (130) may perform data change queries to retrieve some or all of data changes to some or all of the database table of the organization (114-1) as maintained in the database (108), up to a certain logical or wall clock time as corresponding to, or represented by, a certain invocation number.

The PRN generator (132) may be implemented through software, hardware or a combination thereof. The PRN generator (132) may implement the same PRN generation function implemented by a PRN server (e.g., 106, etc.) that provides pseudorandom numbers, to the data change producers (104), to label data changes to a (e.g., each, any, etc.) database table of the organization (114-1). Thus, given the same seed value assigned to the database table and the same invocation number, both the PRN generator (132) used/implemented/accessed by the data change consumers (102) and the PRN servers used/implemented/accessed by the data change producers (104) computes/provides/generates the same pseudorandom number.

The data change consumer recovery handler (134) may be implemented through software, hardware or a combination thereof. The data change consumer recovery handler (134) may implement process recovery functionality to handle process restarts, process failures, etc., of some or all processes (e.g., the data change consumers (102), the data change producers (104), etc.) in connection with data change production and consumption.

In some embodiments, one or more data change producers (e.g., 104, etc.) may comprise (e.g., one or more respective instances of, etc.) a data change capturer 136, a PRN server (e.g., 106, etc.), a data change producer recovery handler 138, etc.

The data change capturer (136) may be implemented through software, hardware or a combination thereof. The data change capturer (136) may perform data change operations to make or commit some or all of data changes to some or all of the database table of the organization (114-1) as maintained in the database (108).

The data change producer recovery handler (138) may be implemented through software, hardware or a combination thereof. The data change producer recovery handler (138) may implement process recovery functionality to handle process restarts, process failures, etc., of some or all processes (e.g., the data change consumers (102), the data change producers (104), etc.) in connection with data change production and consumption.

A data change producer in the data change producers (104) may receive a first request (e.g., from a user device, from an application operating with a user device, etc.) for performing a first specific data change relative to one or more table rows of a database table maintained with the database (108). The database table comprises a plurality of table columns. Under techniques as described herein, the plurality of table columns of the database table comprises (e.g., at least, etc.) an indexed table column used to store pseudorandom numbers to be assigned (e.g., by the PRN server (106), etc.) to, and to distinguish among, different data changes made to the database table in the database (108).

In response to receiving the first request for performing the first specific data change (e.g., the latest data change to the database table, etc.), the data change producer may request the PRN server (106) to assign a first specific pseudorandom number to the first specific data change to be made to the database table in the database (108). The PRN server (106) can invoke a PRN generator (as a part of the PRN server (106) or operating in conjunction with the PRN server (106)) to generate the first specific pseudorandom number to be assigned to identify the first specific data change. The first specific pseudorandom number is generated by the PRN generator based on a seed value and a current invocation number maintained by the PRN server (106) and/or the PRN generator. The seed value may be among one or more seed values 126 (stored in the database (108)0 for one or more databases table (in the database (108)) including but not necessarily limited to only the above-mentioned database table; each of the one or more seed values (126) is assigned to a respective database table in the one or more database tables. For example, the seed value for the above-mentioned database table may be previously (e.g., before the request for performing the first specific data change is received, before any data changes are made to the database table, etc.) assigned to, or preconfigured for, the database table prior to and independent of receiving any request (e.g., the first request, etc.) for performing a data change.

In some embodiments, after using the current invocation number to generate the first specific pseudorandom number for the first specific data change, the PRN server (106) and/or the PRN generator increment the current invocation number (e.g., by one (1), etc.). The incremented current invocation number is to be used for the next data change, to the same database table, immediately following (in time or in a temporal order) the first specific data change among all data changes to the database table.

Upon receiving the first specific PRN number from the PRN server (106) as generated by the PRN generator, the data change producer (or the data change capturer (136) in the one or more data change producers (104) therein) causes or makes the first specific data change to be performed relative to (e.g., in, etc.) the one or more table rows of the database table. As a part of or in addition to the first specific data change, the first specific pseudorandom number is (e.g., caused to be, etc.) stored in the indexed table column for the one or more table rows of the database table. As a result, a PRN-based index generated based on the indexed table column storing pseudorandom numbers corresponding to respective data changes is updated to include the first specific pseudorandom number as a part of index entries in the PRN-based index. The PRN-based index may be among one or more PRN-based indexes 122 (e.g., stored in the database (108), etc.) for the one or more database tables maintained in the database (108). A data change consumer can use the first specific pseudorandom number as a key to look up in the PRN-based index to access the first specific data change made to the database table.

Subsequently, in response to receiving a second request for performing a second specific data change (e.g., the latest data change to the database table, etc.), the data change producer (or another data change producer) may request the PRN server (106) to assign a second specific pseudorandom number to the second specific data change to be made to the database table in the database (108). The second specific data change is to be made the database table and immediately follows (in time or in a temporal order) the first specific data change among all data changes made to the database table.

The PRN server (106) can invoke the PRN generator to generate the second specific pseudorandom number to be assigned to identify the second specific data change. The second specific pseudorandom number is generated by the PRN generator based on the seed value and the current invocation number as maintained by the PRN server (106) and/or the PRN generator. The seed value is a constant for the database table and hence is the same as that used for generating the first specific pseudorandom number. In contrast, the current invocation number is a monotonically increasing value (or in some other embodiments a monotonically decreasing value) over time for the database table. A unique value of the current invocation number is assigned to each data change among a plurality of data changes made to the database table.

Upon receiving the second specific PRN number from the PRN server (106) as generated by the PRN generator, the data change producer (or the data change capturer (136) in the one or more data change producers (104)) causes or makes the second specific data change to be performed relative to (e.g., in, etc.) the database table. As a part of or in addition to the second specific data change, the second specific pseudorandom number is caused or made to be stored in the indexed table column for the one or more table rows of the database table. As a result, the PRN-based index using the indexed table column storing pseudorandom numbers for respective data changes is updated to include the second specific pseudorandom number as a part of the index entries in the PRN-based index. A data change consumer can use the second specific pseudorandom number as a key to look up in the PRN-based index to access the second specific data change made to the database table.

The above described procedure in connection with making the first specific data change and/or the second specific data change can be repeated for any number of (e.g., single, multiple, over time, periodically, on demand, etc.) times.

As a result, even though invocation number values (e.g., a time sequence of values of the current invocation number, etc.) used for generating PRNs for a time sequence of data changes made to the database table are in numeric order (either a numeric order of monotonically increasing or in some other embodiments a numeric order of monotonically decreasing), the PRNs for the time sequence of data changes are not in a numeric order but rather a deterministic sequence of an unordered numeric values as determined by the seed value in combination with the invocation number values in the numeric order.

By way of illustration but not limitation, the PRN server (106), which may or may not be implemented as a part of the one or more data change producers (104) assigns a time sequence of numerically unordered pseudorandom numbers from a time sequence of numerically ordered invocation numbers pseudorandom numbers to a time sequence of data changes (or data changes in a temporal order or in a time order) to a database table in the database (108).

The PRN server (106) can determine or retrieve a seed value assigned to the database table in the database (108), which may store one or more seed values (126) that have already assigned to one or more database tables including but not necessarily limited to only the database table.

Over time, the PRN server (106) may be invoked or requested (e.g., sporadically, frequently, periodically, on demand, etc.) by the one or more data change producers (104) for assigning the time sequence of numerically ordered invocation numbers pseudorandom numbers to the time sequence of data changes to the database table in the database (108).

From request (or invocation) information accompanying requests to (or invocations of) the PRN server (106) from the one or more data change producers (104), the PRN server (106) determines or identifies the time sequence of numerically ordered invocation numbers in the form of a plurality of numerically ordered invocation numbers. These invocation numbers are assigned to the time sequence of data changes in the form of a plurality of temporally ordered data changes to be made by the one or more data change producers (104) relative to (or in) the database table.

Using the seed value assigned to the database table and the time sequence of numerically ordered invocation numbers in the form of the plurality of numerically ordered invocation numbers, the PRN server (106) generates the time sequence of numerically unordered pseudorandom numbers in the form of a plurality of sequentially generated but numerically unordered pseudorandom numbers.

The PRN server (106) provides, to the one or more data change producers (104), the sequentially generated but numerically unordered pseudorandom numbers, which are used to index the temporally ordered data changes to the database table, respectively.

One or more sync tables (124) may be maintained, for example in the database (108), to keep track of pseudorandom numbers that have been assigned to various database tables in the database (108).

The PRN server (106) may internally (e.g., in main memory, in RAM, in cache memory, in one or more data structures, in one or more data constructs, etc.) maintain a sequence of yet-to-be-saved pseudorandom numbers for assigned pseudorandom numbers (assigned to data changes to the database table) that have yet to be saved or recorded in a corresponding sync table (among the one or more sync tables (124)) for the database table.

The PRN server (106) (e.g., periodically, at each invocation by a data change producer for generating a pseudorandom number, etc.) determines whether a total number of pseudorandom numbers in the sequence of yet-to-be-saved pseudorandom numbers including the plurality of sequentially generated but numerically unordered pseudorandom numbers assigned to the plurality of temporally ordered data changes reaches a maximum total number threshold.

Here, each pseudorandom number in the sequence of yet-to-be-saved pseudorandom numbers is generated based on the seed value and a respective invocation number in the sequence of corresponding invocation numbers. The pseudorandom number was used to index a respective data change in a sequence of temporally ordered data changes to which the sequence of corresponding invocation numbers is assigned. The respective invocation number in the sequence of corresponding invocation numbers is assigned to the respective data change in the sequence of temporally ordered data changes.

In response to determining that the total number of pseudorandom numbers in the sequence of yet-to-be-saved pseudorandom numbers reaches a maximum total number threshold, the PRN server (106) saves the sequence of yet-to-be-saved pseudorandom numbers and a sequence of corresponding invocation numbers in the sync table maintained in the database (108). Otherwise, the PRN server (106) continues to internally maintain the yet-to-be-saved pseudorandom numbers and/or corresponding invocation numbers.

In some embodiments, a data change consumer in the one or more data change consumers (102) retrieve data changes to the database table. The data change consumer (or the data change retriever (130) in the one or more data change consumers (102)) determines a first invocation number and a second invocation number greater than the first invocation number. The database change retriever (130) generates a sequence of pseudorandom numbers for all invocation numbers ranging between the first invocation number and the second invocation number. The sequence of pseudorandom numbers begins with a first pseudorandom number generated based on the seed value assigned to the database table and the first invocation number, and ends with a second pseudorandom number generated based on the seed value and the second invocation number.

The data change retriever (130) uses the sequence of pseudorandom numbers to retrieve a sequence of data changes to the database table. The sequence of data changes begins with a first data change indexed with the first pseudorandom number. The sequence of data changes ends with a second data change indexed with a third pseudorandom number. The third pseudorandom number is in the sequence of pseudorandom numbers.

The data change retriever (130) determines whether the third pseudorandom number is the same as the second pseudorandom number. In response to determining that the third pseudorandom number is not the same as the second pseudorandom number, the data change retriever (130) saves a subsequence of pseudorandom numbers in the sequence of pseudorandom numbers to be used in a subsequent request for retrieving data changes to the database table. The subsequence of pseudorandom numbers begins with a fourth pseudorandom number, which is immediately after the third pseudorandom number in the sequence of pseudorandom numbers.

In some embodiments, the data change consumer saves the third pseudorandom number in a sync table (among one or more sync tables 124 maintained with the database (108)) so that on process restart/recovery (e.g., restarting some or all of the one or more data change consumers (102), etc.), one or more new data change consumers can use the sync table to determine the last invocation number (in the previous life cycle) for which a corresponding data change has been retrieved.

The third pseudorandom number and/or the corresponding invocation number, as saved in the sync table can be used to facilitate recovery from process failures and/or process restarts. A new PRN server can use saved pseudorandom numbers and/or saved corresponding invocation numbers (including but not necessarily limited to the third pseudorandom number and/or the corresponding invocation number) in the sync table to determine the last saved pseudorandom number and/or the last saved invocation number in the previous life cycle of the PRN server. Based on the last saved pseudorandom number and/or the last saved invocation number, the new PRN server can start probing in the database table and determining whether the last saved pseudorandom number and/or the last saved invocation number corresponding to the actual last data change to the database table, or whether any additional data change(s) occur subsequent to the data change to which the last saved pseudorandom number and/or the last saved invocation number are assigned.

By way of illustration but not limitation, the PRN server (106) (or a new instance thereof, a new life cycle thereof) can recover from a process restart or a process failure as follows.

On restarting from the process restart/failure, the PRN server (106) can determine/retrieve the last saved assigned pseudorandom number and/or the last saved assigned invocation number and a seed value assigned to a database table, some or all of which may be persisted locally or remotely (e.g., stored in the database (108), etc.). It should be noted that, in some embodiments, the last saved assigned pseudorandom number that indexes a data change made to the database table may be derived (e.g., instead of retrieved) based on the seed value and the last saved assigned invocation number.

The PRN server (106) may generate a test (e.g., candidate, probing, etc.) pseudorandom number based on the seed value and a test invocation number generated by incrementing the last saved assigned invocation number. Using the test pseudorandom number, the PRN server can determine whether a specific data change indexed by the test pseudorandom number was made to the database table in the previous life cycle by examining the database table to determine whether the test pseudorandom number is stored with the data change in the database table.

In response to determining the test pseudorandom number was used to index the specific data change made to the database table, the PRN server (106) can perform the following steps, repeatedly, recursively and/or iteratively. First, the PRN server (106) can generate a second test (or probing) pseudorandom number based on the seed value and a second test invocation number generated by incrementing (e.g., by one (1), by five (5), by one hundred (100), . . . by twenty thousands (20,000), by a step corresponding or scalable to how frequently the database table is updated/changed) the test (or probing) invocation number previously mentioned. Second, the PRN server (106) can determine whether the second test pseudorandom number was used to index a second specific data change made to the database table, similar to the steps performed in connection with the previously mentioned test pseudorandom number.

The foregoing can be performed repeatedly, recursively and/or iteratively, until the PRN server (106) encounters an N-th test (or probing) pseudorandom number or an N-th test (or probing) invocation number to which a corresponding data change is not found in the database table, where N is a positive integer.

In operational scenarios in which a step value greater than one (1) is used to increment the foregoing test (or probing) invocation number(s) each time, the (N−1)-th test (or probing) pseudorandom number or the (N−1)-th test (or probing) invocation number may not actually indicate the last assigned pseudorandom number or the last assigned invocation number; correspondingly, the N-th test (or probing) pseudorandom number or the N-th test (or probing) invocation number may not actually indicate the first unassigned pseudorandom number or the first unassigned invocation number.

In some embodiments, a binary chop algorithm (e.g., with a logarithmic computational complexity, etc.), method, procedure, etc., may be implemented and/or performed by the PRN server (106) to identify the last actually assigned pseudorandom number or the last actually assigned invocation number to the database table.

For example, in response to determining the N-th test pseudorandom number and/or the N-th invocation number were not used to index a specific data change made to the database table, the PRN server (106) can perform the following operations. In the first operation (or step), the PRN server (106) generates a (N+1)-th test pseudorandom number based on the seed value and a (N+1)-th test (probing) invocation number. The (N+1)-th test invocation number is an intermediate value (or whole number) between the (N−1)-th saved assigned invocation number and the N-th test invocation number. In the second operation (or step), the PRN server (106) can determine whether the (N+1)-th test pseudorandom number was used to index a specific data change made to the database table.

In response to determining that the (N+1)-th test pseudorandom number was used to index a specific data change made to the database table, the PRN server (106) generates a (N+2)-th test pseudorandom number based on the seed value and a (N+2)-th test (probing) invocation number. The (N+2)-th test invocation number is an intermediate value (or whole number) between the (N+1)-th saved assigned invocation number and the N-th test invocation number. The first and second operations (or steps) as previously described are then repeated.

Otherwise, in response to determining that the (N+1)-th test pseudorandom number was not used to index a specific data change made to the database table, the PRN server (106) generates a (N+2)-th test pseudorandom number based on the seed value and a (N+2)-th test (probing) invocation number. The (N+2)-th test invocation number is an intermediate value (or whole number) between the (N−1)-th saved assigned invocation number and the (N+1)-th test invocation number. The first and second operations (or steps) as previously described are then repeated.

In some embodiments, a data change consumer as described herein also can save pseudorandom numbers and/or corresponding invocation numbers for which corresponding data changes to the database table have been retrieved in a (e.g., consumer, etc.) sync table, which may be persisted locally or remotely, for example in the database (108). These saved pseudorandom numbers and/or the corresponding invocation numbers in the (consumer) sync table can be used to facilitate recovery from process failures and/or process restarts. A new data change consumer can use saved pseudorandom numbers and/or saved corresponding invocation numbers in the (consumer) sync table to determine the last pseudorandom number and/or the last invocation number in the previous life cycle of the data change consumer and further determine the last retrieved data change to which the last pseudorandom number and/or the last invocation number are assigned.

2.3 Indexes for Data Change Production and Consumption

FIG. 2A illustrates an example database table (denoted as "PersonTable1") comprising a plurality of table columns such as "name", "description", "system timestamp," etc. A first data change may be made to the "PersonTable1" table at a first time as indicated by a first "system timestamp" value of "t1". The first data change comprises a first "name" value of "A1" and a first "description" value of "D1". A second data change may be made to the "PersonTable1" table at a second time, subsequent to the first time, as indicated by a second "system timestamp" value of "t2". The second data change comprises a second "name" value of "A2" and a second "description" value of "D2". A third data change may be made to the "PersonTable1" table at a third time, subsequent to the second time, as indicated by a third "system timestamp" value of "t3". The third data change comprises a third "name" value of "A3" and a third "description" value of "D3".

The "system timestamp" values such as "t1", "t2", "t3", etc., may be generated automatically to indicate specific time points (e.g., logical time points, wall clock times, beginning times of database transactions that make the data changes, commit times of database transactions that make the data changes, etc.) at which the data changes are made to the database table. The "system timestamp" values are monotonically increasing over time. Thus, the "system timestamp" values over time exhibit a numeric order that is the same as a temporal order in which the data changes are made to the database table "PersonTable1".

As used herein, the term "data change" may refer to a change to data in a database table since the last processed change to the database table. A system timestamp or a system timestamp value for a data change refers to a specific time point such as a logical time point, a wall clock time, the beginning time of a database transaction that makes the data change, the commit time of database transaction that makes the data change, etc.

In some embodiments, a table column in a database table, such as the "system timestamp" table column of the database table "PersonTable1" as illustrated in FIG. 2A, may be used as an index column.

To access data changes to a database table in a temporal order in which the data changes are made, a data change consumer of the database table (e.g., a Person table, an Accounts table, etc.) can use a system-timestamp-based index to find out all the data changes that have happened in a given time interval. For example, a data change consumer may query all data changes that fall within a time range such as t1→t3 as illustrated in FIG. 2A using the sequence-number-based index of the database table.

FIG. 2B illustrates an example database table (denoted as "PersonTable2") comprising a plurality of table columns such as "name", "description", "sequence number," etc. A first data change may be made to the "PersonTable2" table at a first logical time as indicated by a first "sequence number" value of "seq1". In FIG. 2B, as in FIG. 2A, the first data change comprises a first "name" value of "A1" and a first "description" value of "D1". A second data change may be made to the "PersonTable2" table at a second logical time, subsequent to the first logical time, as indicated by a second "sequence number" value of "seq2". The second data change comprises a second "name" value of "A2" and a second "description" value of "D2". A third data change may be made to the "PersonTable2" table at a third logical time, subsequent to the second logical time, as indicated by a third "sequence number" value of "seq3". The third data change comprises a third "name" value of "A3" and a third "description" value of "D3".

The "sequence number" values such as "seq1", "seq2", "seq3", etc., may be generated automatically to indicate specific logical times at which the data changes are made to the database table.

In some embodiments, the "sequence number" values are monotonically increasing (may or may not increment with a constant step) over time, such as 1, 2, 7, 9, 13, 20, etc., along a time direction. In these embodiments, the "sequence number" values over time exhibit a numeric order that is the same as a temporal order in which the data changes are made to the database table "PersonTable2".

In some other embodiments, the "sequence number" values are monotonically decreasing (may or may not decrement with a constant step) over time, such as . . . 200, . . . 13, 12, 11, 1, etc., along a time direction. In these embodiments, the "sequence number" values over time exhibit a numeric order that is the opposite or inverse to a temporal order in which the data changes are made to the database table "PersonTable2".

In some embodiments, a "sequence number" table column in a database table (e.g., the database table "PersonTable2" as illustrated in FIG. 2B, etc.) may be used as an index column.

To access data changes to a database table in a temporal order in which the data changes are made, a data change consumer of a database table can use a sequence-number-based index to find out all the data changes that have happened in a given sequence number range. For example, a data change consumer may query all data changes that fall within a sequence number range such as seq1→seq3 as illustrated in FIG. 2B using the system-timestamp-based index of the database table.

While these approaches such as illustrated with FIG. 2A and FIG. 2B seem logically sound and simple, they suffer from a serious scalability and performance issue due to significant contention on system-timestamp-based indexes and/or sequence-number-based indexes for database tables in the database, among other problems.

FIG. 2C illustrates an example database table (denoted as "PersonTable3") comprising a plurality of table columns such as "name", "description", "PseudoRandomNumber", etc. In some embodiments, a seed value is (e.g., before any data change is made to the "PersonTable3" table, upon the very first data change made to the "PersonTable3" table, etc.) configured for, or assigned to, the "PersonTable3" table.

A first data change may be made to the "PersonTable3" table at a first logical time as indicated by a first invocation number in a time sequence of numerically ordered invocation numbers (e.g., in a temporal order, in a time order, etc.). The first invocation number may be used (e.g., by a PRN generator, a PRN server 106, etc.) to generate a first pseudorandom number (denoted as "prn1") in a time sequence of numerically unordered pseudorandom numbers (e.g., in a temporal order, in a time order, etc.). In FIG. 2C, as in FIG. 2A and FIG. 2B, the first data change comprises a first "name" value of "A1" and a first "description" value of "D1".

A second data change may be made to the "PersonTable3" table at a second logical time, subsequent to the first logical time, as indicated by a second invocation number in the time sequence of numerically ordered invocation numbers. The second invocation number may be used (e.g., by a PRN generator, a PRN server 106, etc.) to generate a second pseudorandom number (denoted as "prn2") in the time sequence of numerically unordered pseudorandom numbers. The second data change comprises a second "name" value of "A2" and a second "description" value of "D2".

A third data change may be made to the "PersonTable3" table at a third logical time, subsequent to the second logical time, as indicated by a third invocation number in the time sequence of numerically ordered invocation numbers. The third invocation number may be used (e.g., by a PRN generator, a PRN server 106, etc.) to generate a third pseudorandom number (denoted as "prn3") in the time sequence of numerically unordered pseudorandom numbers. The third data change comprises a third "name" value of "A3" and a third "description" value of "D3".

The pseudorandom number values such as "prn1", "prn2", "prn3", etc., may be generated (e.g., by a PRN generator, a PRN server 106, etc.) automatically. The invocation number values (corresponding to the pseudorandom number values) and/or the pseudorandom number values may be used to indicate logical times at which respective data changes are made to the database table.

Under techniques as described herein, the invocation number values are monotonically increasing (or decreasing in some other embodiments) over time, such as 1, 2, 3, 4, 5, 6, etc., along a time direction. In these embodiments, the invocation number values over time exhibit a numeric order that is the same as a temporal order in which the data changes are made to the database table "PersonTable3".

However, the pseudorandom number values are numerically unordered over time, such as 10, 2, 4, 3, 0, 20, etc., along a time direction. In these embodiments, the pseudorandom number values over time does not exhibit a numeric order that is the same as a temporal order in which the data changes are made to the database table "PersonTable3".

In some embodiments, a "pseudorandom number" table column in a database table (e.g., the database table "PersonTable3" as illustrated in FIG. 2C, etc.) may be used as an index column. As the pseudorandom number values are numerically unordered over time, the last processed data changes to the "PersonTable3" table have different numeric values that are not ordered. As a result, index entries for these last processed data changes are not concentrated in the last block of a B-tree index implementing the pseudorandom-number-based index. Thus, when data change consumers access these last processed data changes, and/or when data change producers generate further processed data changes, these read and write data accesses are distributed over many blocks of the B-tree index rather than concentrated on the last block of the B-tree index.

Techniques as described do not preclude other types of indexes to be generated for a database table. For example, the pseudorandom-number-based index may be implemented in place of or in addition to another index such as a system-timestamp-based index, a sequence-number-based index, etc. In addition, a pseudorandom-number-based index may incorporate zero or more other index columns. For example, a pseudorandom number table column may be used as a primary index column. Zero or more other non-primary index columns such as an invocation number column, a system timestamp column, a sequence number column, etc., may be used in a pseudorandom-number-based index as described herein.

FIG. 2D illustrates an example database table (denoted as "PersonTable4") comprising a plurality of table columns such as "name", "description", "PseudoRandomNumber", "System Timestamp", etc. The "System Timestamp" table column may be used in a separate index other than a pseudorandom-number-based index of the "PersonTable4" table, or in a pseudorandom-number-based index of the "PersonTable4" table as one of the index columns of the pseudorandom-number-based index.

2.4 Time Sequences of Invocation Numbers and PRNs

Figure 3:
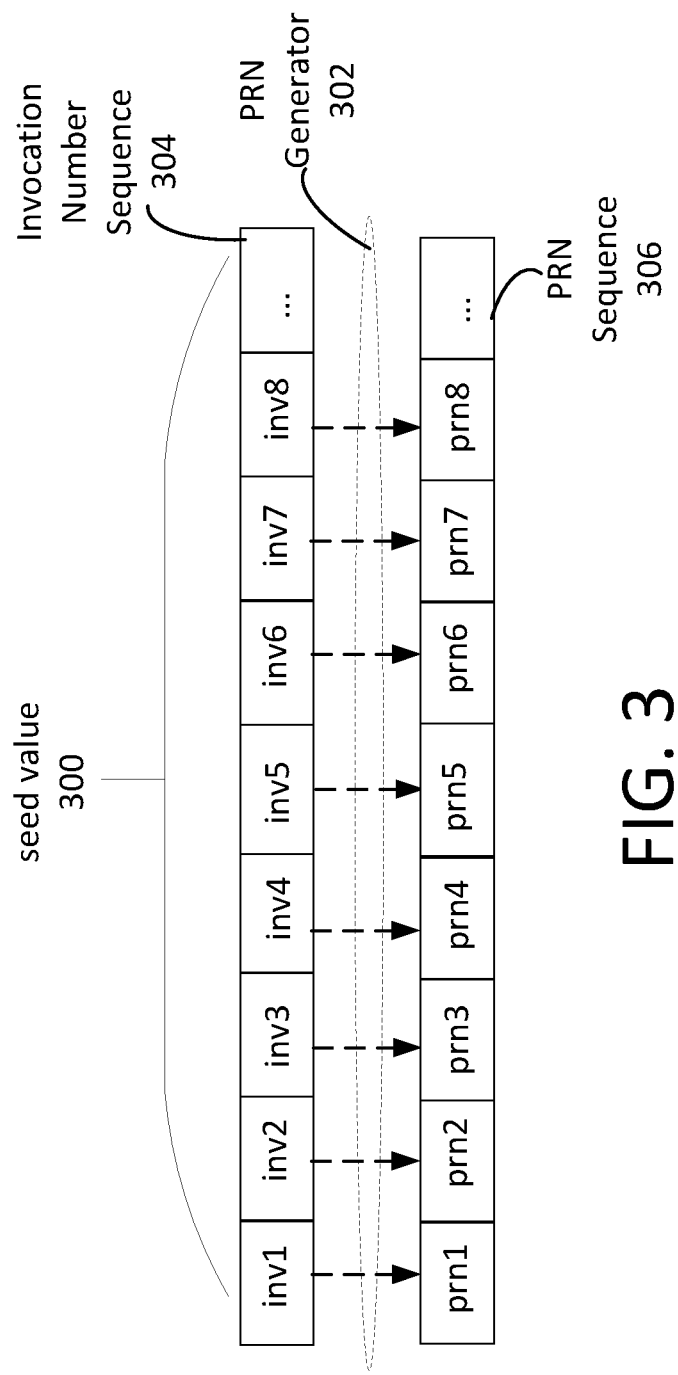
FIG. 3 illustrates an example time sequence of pseudo-random numbers.

FIG. 3 illustrates an example time sequence 306 of pseudorandom numbers such as "prn1", "prn2", ... "prn8", etc., generated by a PRN generator 300 using a seed value 300 and a time sequence 304 of invocation numbers such as "inv1", "inv2", ... "inv8", etc.

The PRN generator (300) may be any function or mapping capable of generating a sequence (e.g., the time sequence (306) of pseudorandom numbers, etc.) of numerically unordered numbers such as random numbers from a sequence (e.g., the time sequence (304) of invocation numbers, etc.) of numerically ordered numbers in a deterministic or reproducible manner given a seed value.

As used herein, "deterministic" or "reproducible" means that the same sequence of numerically unordered numbers (e.g., the same time sequence of numerically unordered pseudorandom numbers, etc.) is determined/reproduced with respect to the same database table in all data change producers and consumers, so long as the same seed value and the same sequence of ordered numbers (e.g., the same time sequence of invocation numbers, etc.) are used as input and the same function/mapping is used for generating the pseudorandom numbers from the seed value and the ordered numbers (e.g., the invocation numbers, etc.).

For example, one or more PRN generators (e.g., 302, etc.) using a specific function or mapping to generate pseudorandom numbers may be implemented or accessed by a data change consumer, a data change producer, and/or a PRN server. Given the seed value (300) and the time sequence of invocation numbers such as 1, 2, 3, 4, 5, 6, etc., respectively for "inv1", "inv2", "inv3", "inv4", "inv5", inv6", etc., all the PRN generators (e.g., 302, etc.) generate the same time sequence of pseudorandom numbers such as 10, 2, 4, 3, 0, 20, etc., respectively for "prn1", "prn2", "prn3", "prn4", "prn5", prn6", etc., so long as the same specific function or mapping is used to generate the pseudorandom numbers, regardless of whether or not these PRN generators are accessed or implemented by the data change consumer, the data change producer, and/or the PRN server.

Time sequences of invocation numbers and PRNs as described herein can be used in a wide variety of operational scenarios associated with data change production and consumption.

In an example, in some operational scenarios, a data change consumer can access a PRN generator to generate a corresponding subsequence of numerically unordered pseudorandom numbers (e.g., in the time sequence (306) of PRNs, etc.) using the seed value (300) and a subsequence of numerically ordered invocation numbers (e.g., in the time sequence (304) of invocation numbers, etc.) as input. Subsequently, the data change consumer can use the subsequence of (e.g., five, 100, twenty thousand, etc.) numerically ordered invocation numbers to query for or retrieve a corresponding subsequence of data changes to the database table. Data retrieval operations can use the corresponding subsequence of numerically unordered pseudorandom numbers to access corresponding index entries of a pseudorandom-number-based index of the database table to access and retrieve corresponding data changes made to the database table.

By way of illustration but not limitation, assume that the data retrieval operations return corresponding three data changes for some but not all of the pseudorandom numbers such as the first three pseudorandom numbers. However, data changes for the fourth and fifth pseudorandom numbers are not found, for example as these data changes may not have occurred or may not have been committed to the database table. In some embodiments, unused pseudorandom numbers in the data retrieval operations, namely the fourth and fifth pseudorandom numbers in the present example, are saved for the next round of data retrieval operations for example internally (e.g., in a data table, a data structure, a list, an array, etc.) by the data change consumer.

When the next round of data retrieval operations is to be made (e.g., on a data change retrieval schedule, on demand, etc.), the fourth and fifth pseudorandom numbers, as well as any newly generated subsequent pseudorandom numbers based on new subsequent invocation numbers (e.g., immediately, etc.) following the fourth and fifth invocation numbers, may be used to access the pseudorandom-number-based index for retrieving corresponding new data changes from the database table corresponding to the fourth and fifth pseudorandom numbers as well as the newly generated subsequent pseudorandom numbers if applicable.

In another example, in some operational scenarios, data changes returned from the database table by way of the pseudorandom-number-based index may or may not be ordered along a temporal order. If the return results (e.g., data changes, etc.) from the database table are ordered, then the order set forth in the return results may be directly used. On the other hand, if the returned results from the database table are unordered, the subsequence of invocation numbers and/or the corresponding subsequence of PRNs that are in the temporal order already can be used to line up the data changes in the temporal order.

In a further example, in some operational scenarios, some or all of data change consumers, data change producers, and/or a PRN server, can experience process restarts or process failures. A data change producer as described herein may save a (e.g., fixed, preconfigured, every hundred, every 20 thousands, when a timer is fired, up to a certain time interval, etc.) number of assigned invocation numbers and/or a (e.g., fixed, preconfigured, every hundred, every 20 thousands, when a timer is fired, up to a certain time interval, etc.) number of assigned pseudorandom numbers into a (e.g., producer, PRN server, etc.) sync table, which may be persisted locally and/or remotely, for example in the database (108). When the data change producer restarts (or a new data change producer instance starts), the data change producer can determine the last saved invocation numbers and/or the saved pseudorandom numbers in the sync table. Using these last saved invocation numbers and/or pseudorandom numbers, the data change producer can further probe the actual last processed data change made in the database table based on the binary chop algorithm, method, procedure, etc., as previously described.

Additionally, optionally or alternatively, a data change consumer as described herein may also save invocation numbers and/or pseudorandom numbers, for which data changes have been retrieved or consumed, into a (e.g., consumer, etc.) sync table, which may be persisted locally and/or remotely, for example in the database (108). On process restart/recovery from a process failure, the saved invocation numbers and/or pseudorandom numbers in the sync table can be used as a starting point by a new data change consumer (instance) to retrieve all data changes to the database table that have yet to be retrieved/consumed, up to the very last processed data change in the database table.

While invocation numbers are sequentially ordered over time and distinct from one another, pseudorandom numbers generated from the invocation numbers in a temporal order may or may contain duplicates. In some embodiments, in which pseudorandom numbers may contain duplicates, the invocation numbers may be used to disambiguate a specific temporal order from the pseudorandom numbers, so long as the pseudorandom numbers contain sufficiently long unrepetitive subsequences (or not repetitive beyond a certain subsequence length such as 5, 10, 20, etc.) within the entire time sequence of the pseudorandom numbers, even if the entire sequence of pseudorandom numbers may contain occasional duplicates.

In some embodiments, an invocation number (or a corresponding pseudorandom number generated therefrom) may be used to label a data change, whether or not the data change represents an addition, an insertion, an update, a deletion, etc. A deletion-type of data change may be logical or physical.

In some embodiments, if a row is logically deleted, the deleted row may be indicated by a table column value of zero (0) rather than being physically removed from a data block of the database table; in comparison, a not-yet-deleted row may be indicated by a table column value of one (1). Data changes to the database table may be assigned their respective invocation numbers and/or respective pseudorandom numbers. The respective pseudorandom numbers may be used to generate a pseudorandom-number-based index directly for the database table.

In some embodiments, if a deletion in the database table is physically deleted (e.g., a row is physically removed from a data block previously containing the row, etc.), a data change table attendant to the database table may be used to track data changes made to the database table. Data changes as tracked in the data change table of the database table may be assigned their respective invocation numbers and/or respective pseudorandom numbers. The respective pseudorandom numbers may be used to generate a pseudorandom-number-based index (indirectly for the database table) for the data change table attendant to the database table.

In some embodiments, a data change consumer may remove data changes, which have been consumed/retrieved by the data change consumer, from the data change table. Thus, in many operational scenarios, the data change table may contain zero or very few data changes. Upon process restart/failure, (e.g., a new instance of, etc.) the data change consumer can determine whether the data change is empty. If so, the data change consumer determines or infers that all last processed data changes have been consumed in the previous life cycle, and that all later added data changes to the data change table are yet to be retrieved/consumed data changes made to the database table.

An invocation number and/or a pseudorandom number as described herein may be assigned to a data change at a single row level, at multiple row level, at an individual row group level, etc., depending on specific implementations for data change production and consumption.

Additionally, optionally or alternatively, multiple pseudorandom-number-based indexes may be created for a database table or a data change table thereof. For example, one of the multiple pseudorandom-number-based indexes may identify a data change at a single row level, whereas another of the multiple pseudorandom-number-based indexes may identify a data change at a single row group level, at multiple row level, etc.

Additionally, optionally or alternatively, a pseudorandom-number-based index as described herein may comprise a single index table column or multiple index table columns. For example, a pseudorandom-number-based index may comprise a PRN table column as well as one or more non-PRN table columns. All of the PRN table column and the one or more non-PRN table columns in the index can be used collectively (e.g., in data retrieval operations, etc.) to identify data change at the single row level. Some but not all of the PRN table column and the one or more non-PRN table columns can be used (e.g., in data retrieval operations, etc.) to identify data change at the row group level, at the multiple row level, etc.

For the purpose of illustration only, it has been described that a time sequence of pseudorandom numbers may be used to index data changes made to a database table maintained in a database. It should be noted that, in various embodiments, data changes to a data construct other than a database table maintained in a database may also be indexed through a pseudorandom-number-based index. Example data constructs to be indexed by such a index may include, but are not necessarily limited to only, any of data structures or data tables whether they are maintained in memory, in database, locally or remotely. In some embodiments, a pseudorandom-number-based index as described herein may be used to index data changes in connection with a materialized view, a materialized query table, etc.

3.0 Example Embodiments

Figure 4A:
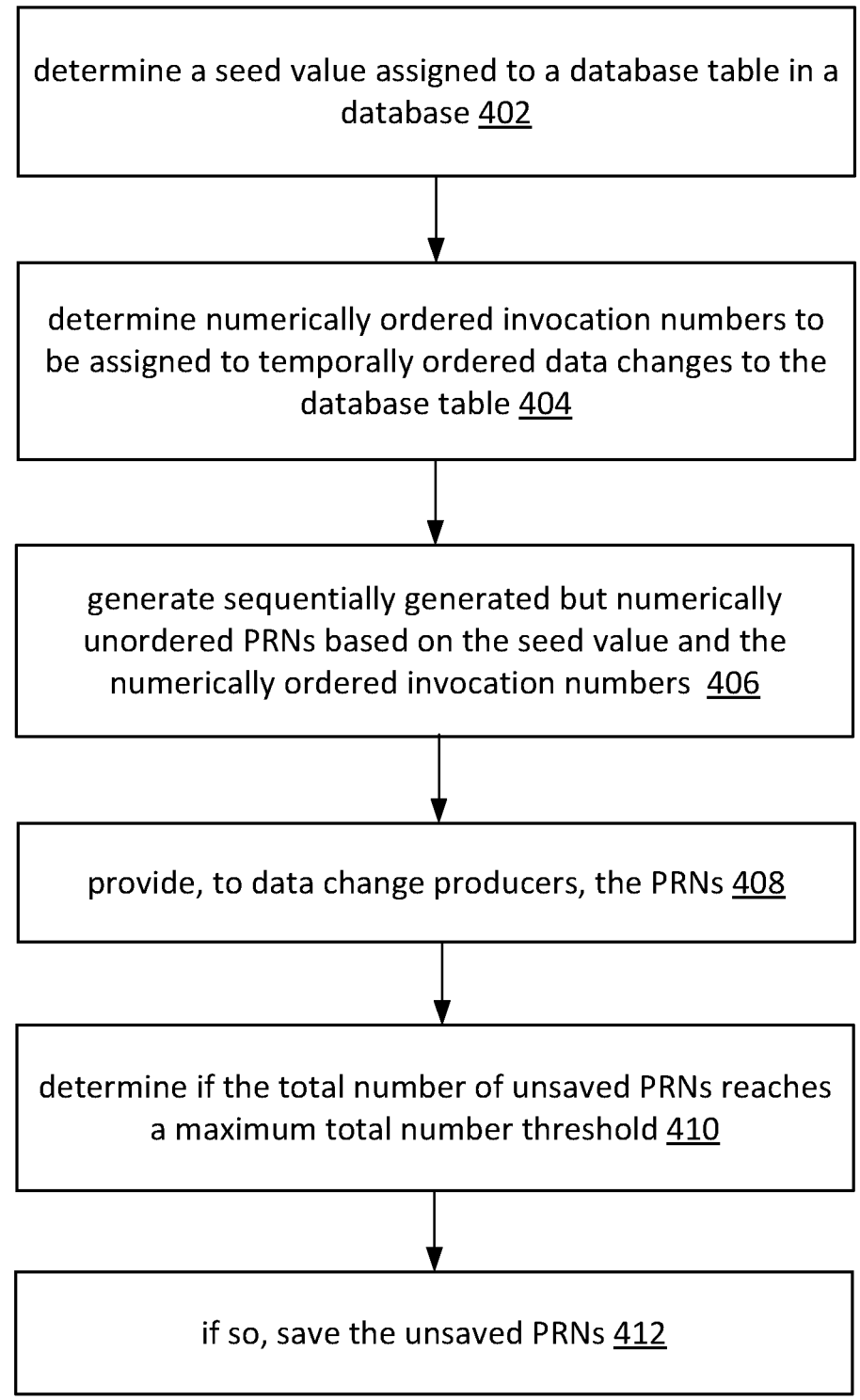
FIG. 4A through FIG. 4D illustrate example process flows.

FIG. 4A illustrates an example process flow that may be implemented by one or more computing devices such as a PRN server (or generator) in one or more of: a database server, an application server, a combination of database and application servers, etc., as described herein. In block 402, the PRN server determines a seed value assigned to a database table in a database. The seed value is to be used to generate a time sequence of numerically unordered pseudorandom numbers from a sequence of numerically ordered invocation numbers.

In block 404, the PRN server determines a plurality of numerically ordered invocation numbers to be assigned to a plurality of temporally ordered data changes to be made by one or more data change producers relative to the database table.

In block 406, the PRN server generates a plurality of sequentially generated but numerically unordered pseudorandom numbers based on the seed value and the plurality of numerically ordered invocation numbers. The plurality of sequentially generated but numerically unordered pseudorandom numbers is used to index the plurality of temporally ordered data changes to the database table.

In block 408, the PRN server provides, to the one or more data change producers, the plurality of sequentially generated but numerically unordered pseudorandom numbers.

In block 410, the PRN server determines whether a total number of pseudorandom numbers in a sequence of yet-to-be-saved pseudorandom numbers including the plurality of sequentially generated but numerically unordered pseudorandom numbers assigned to the plurality of temporally ordered data changes reaches a maximum total number threshold.

In block 412, in response to determining that the total number of pseudorandom numbers in the sequence of yet-to-be-saved pseudorandom numbers including the plurality of sequentially generated but numerically unordered pseudorandom numbers assigned to the plurality of temporally ordered data changes reaches the maximum total number threshold, the PRN server saves the sequence of yet-to-be-saved pseudorandom numbers and a sequence of corresponding invocation numbers.

In an embodiment, (e.g., the last, etc.) assigned pseudorandom numbers such as the third pseudorandom number as mentioned above are saved in a sync table so that on recovery from process restart/failure, one or more of a data change consumer, a data change producer and/or a PRN server/generator (or one or more new instances thereof) are enabled to use saved information in the sync table to determine the last invocation number, the last pseudorandom number and/or the last data change in the previous life cycle.

In an embodiment, each pseudorandom number in the sequence of yet-to-be-saved pseudorandom numbers as previously mentioned is generated based on the seed value and a respective invocation number in the sequence of corresponding invocation numbers; each such pseudorandom number was used to index a respective data change in a sequence of temporally ordered data changes to which the sequence of corresponding invocation numbers is assigned; the respective invocation number in the sequence of corresponding invocation numbers is assigned to the respective data change in the sequence of temporally ordered data changes.

Figure 4B:
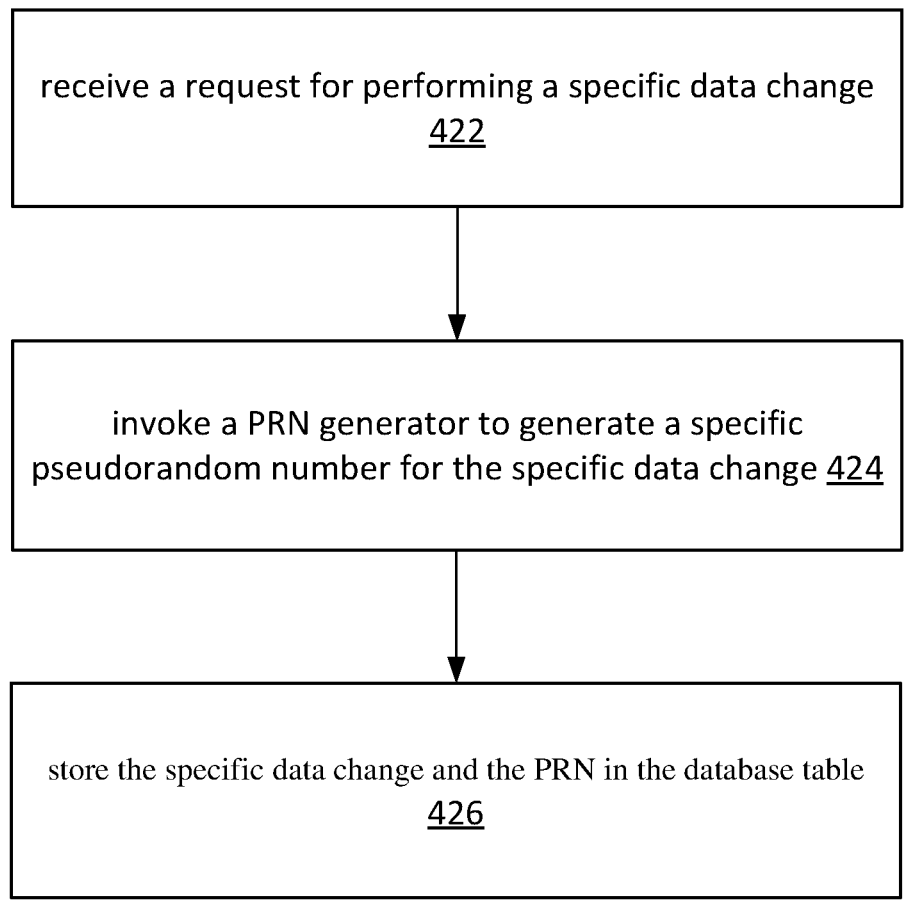

FIG. 4B illustrates an example process flow that may be implemented by one or more computing devices such as a data change producer in one or more of: a database server, an application server, a combination of database and application servers, etc., as described herein. In block 422, the data change producer receives a request for performing a specific data change relative to one or more table rows of a database table that comprises a plurality of table columns. The plurality of table columns of the database table comprising an indexed table column used to store pseudorandom numbers.

In block 424, the data change producer invokes a pseudorandom number generator to generate a specific pseudorandom number to be assigned to identify the specific data change. The specific pseudorandom number is generated based on a seed value and a current invocation number maintained by the pseudorandom number generator. The seed value is previously assigned to the database table prior to and independent of receiving the request for performing the specific data change.

In block 426, the data change producer causes the specific data change to be performed relative to the one or more table rows of the database table. The specific pseudorandom number is caused to be stored in the indexed table column for the one or more table rows of the database table.

Figure 4C:
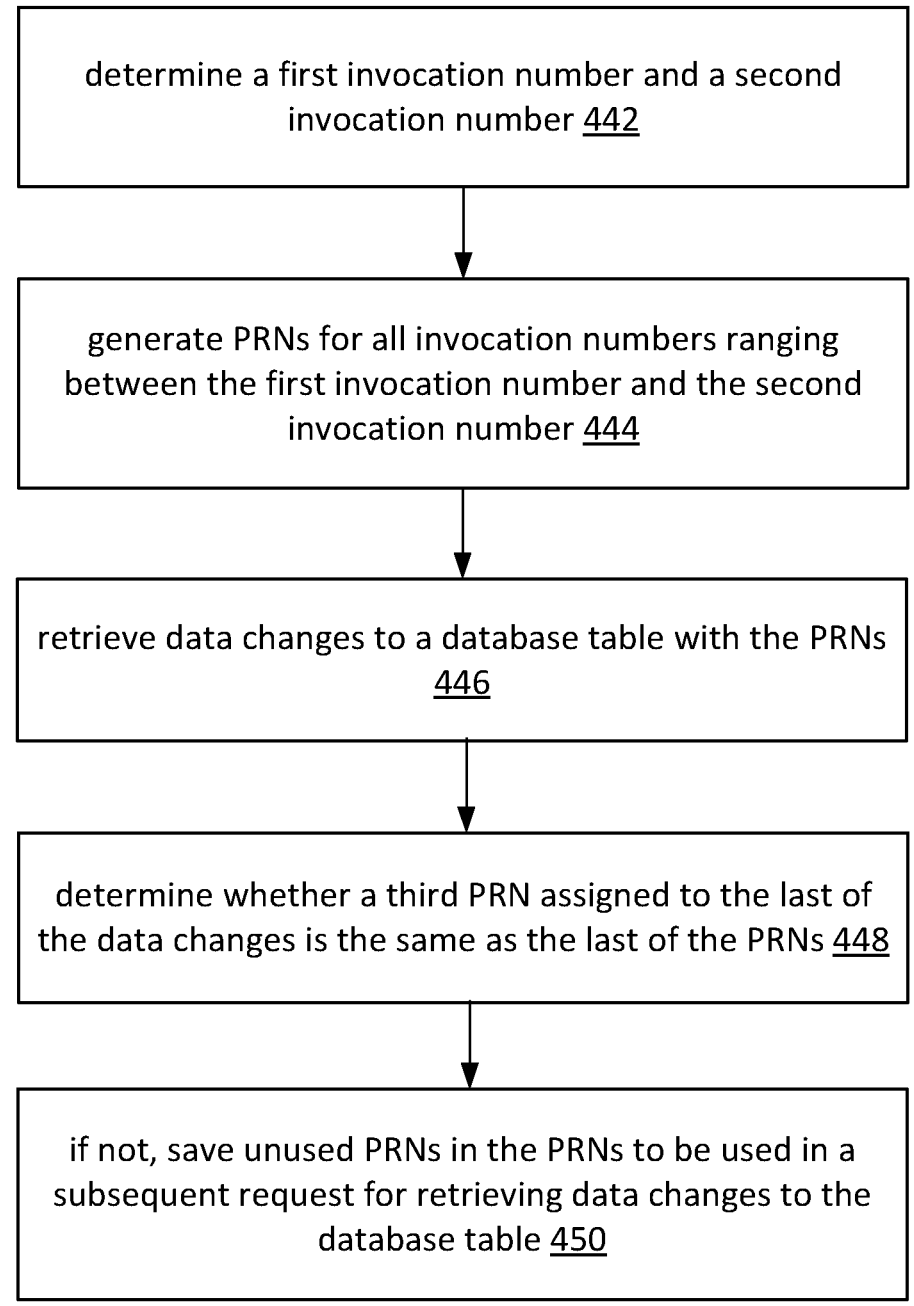

FIG. 4C illustrates an example process flow that may be implemented by one or more computing devices such as a data change consumer in one or more of: a database server, an application server, a combination of database and application servers, etc., as described herein. In block 442, the data change consumer determines a first invocation number and a second invocation number greater than the first invocation number.

In block 444, the data change consumer generates a sequence of pseudorandom numbers for all invocation numbers ranging between the first invocation number and the second invocation number. The sequence of pseudorandom numbers begins with a first pseudorandom number generated based on a seed value and the first invocation number. The sequence of pseudorandom numbers ends with a second pseudorandom number generated based on the seed value and the second invocation number.

In block 446, the data change consumer retrieves a sequence of data changes to the database table with the sequence of pseudorandom numbers. The sequence of data changes begins with a first data change indexed with the first pseudorandom number. The sequence of data changes ends with a second data change indexed with a third pseudorandom number. The third pseudorandom number is in the sequence of pseudorandom numbers.

In block 448, the data change consumer determines whether the third pseudorandom number is the same as the second pseudorandom number.

In block 450, in response to determining that the third pseudorandom number is not the same as the second pseudorandom number, the data change consumer saves a subsequence of pseudorandom numbers in the sequence of pseudorandom numbers to be used in a subsequent request for retrieving data changes to the database table. The subsequence of pseudorandom numbers begins with a fourth pseudorandom number, which is immediately after the third pseudorandom number in the sequence of pseudorandom numbers.

Figure 4D:
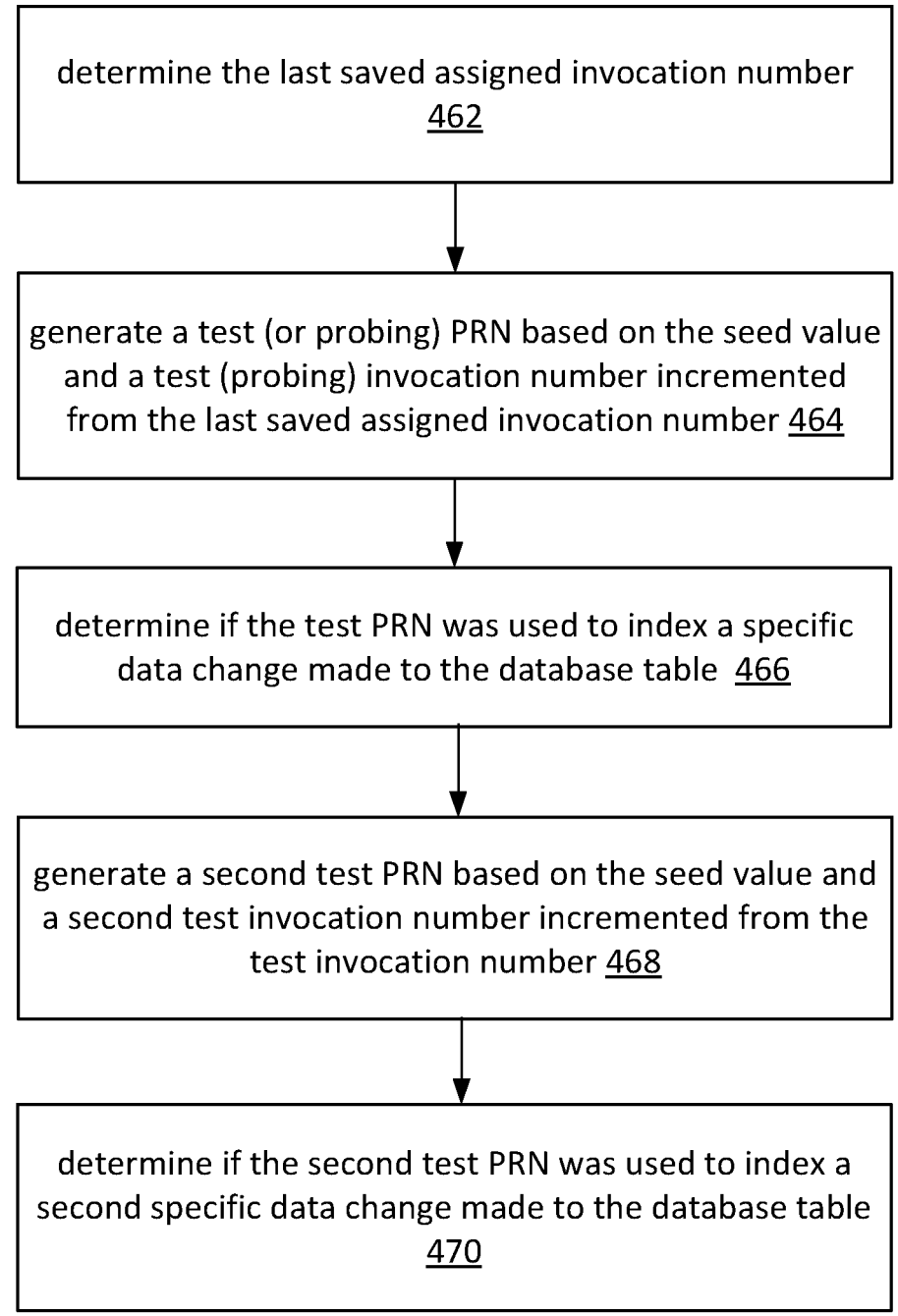

FIG. 4D illustrates an example process flow that may be implemented by one or more computing devices such as a PRN server (or generator) in one or more of: a database server, an application server, a combination of database and application servers, etc., as described herein. In block 462, the PRN server (e.g., on a process restart/failure, etc.) determines the last saved assigned invocation number used, along with a seed value assigned to a database table, to generate a pseudorandom number (e.g., the last saved pseudorandom number, etc.) that indexes a data change made to the database table.

In block 464, the PRN server generates a test pseudorandom number based on the seed value and a test invocation number generated by incrementing the last saved assigned invocation number.

In block 466, the PRN server determines whether the test pseudorandom number was used to index a specific data change made to the database table.

In block 468, in response to determining the test pseudorandom number was used to index the specific data change made to the database table, the PRN server generates a second test pseudorandom number based on the seed value and a second test invocation number generated by incrementing the test invocation number.

In block 470, the PRN server determines whether the second test pseudorandom number was used to index a second specific data change made to the database table.

In an embodiment, the test invocation number is incremented from the last saved assigned invocation number by more than one (1).

In an embodiment, the PRN server is further configured to, in response to determining the test pseudorandom number was not used to index the specific data change made to the database table, perform: generating a third test pseudorandom number based on the seed value and a third test invocation number, the third test invocation number being an intermediate value between the last saved assigned invocation number and the test invocation number; determining whether the third test pseudorandom number was used to index a third specific data change made to the database table.

In some embodiments, process flows involving operations, methods, etc., as described herein can be performed through one or more computing devices or units.

In an embodiment, an apparatus comprises a processor and is configured to perform any of these operations, methods, process flows, etc.

In an embodiment, a non-transitory computer readable storage medium, storing software instructions, which when executed by one or more processors cause performance of any of these operations, methods, process flows, etc.

In an embodiment, a computing device comprising one or more processors and one or more storage media storing a set of instructions which, when executed by the one or more processors, cause performance of any of these operations, methods, process flows, etc. Note that, although separate embodiments are discussed herein, any combination of embodiments and/or partial embodiments discussed herein may be combined to form further embodiments.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
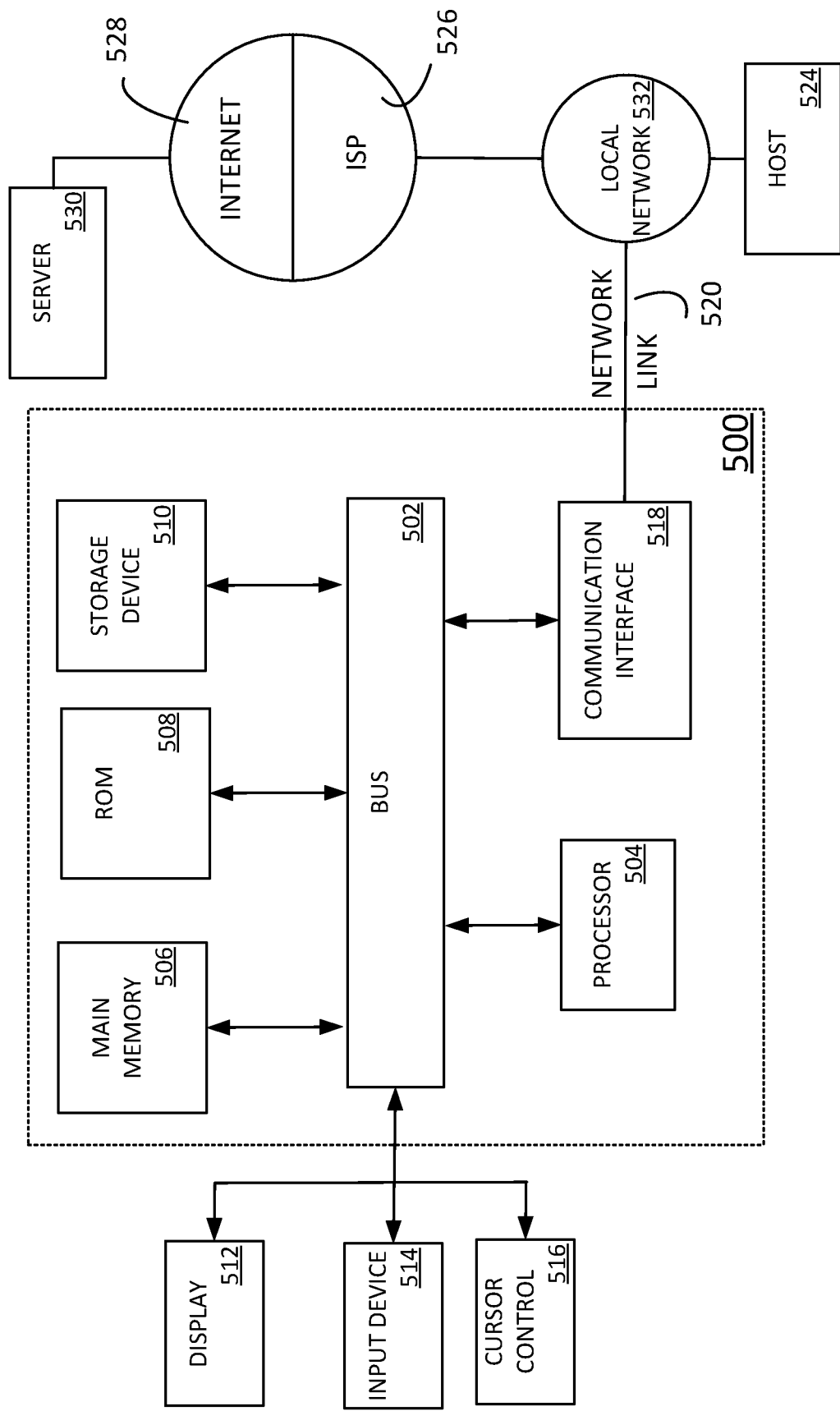
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is device-specific to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using device-specific hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

5.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    detecting that a sequence of data changes was made to data values of a database table, wherein the sequence of data changes is indexed in a data change index based on pseudorandom numbers;
    determining a first invocation number and a second invocation number greater than the first invocation number;
    generating a sequence of pseudorandom numbers for all invocation numbers ranging between the first invocation number and the second invocation number, wherein the sequence of pseudorandom numbers begins with a first pseudorandom number generated based on a seed value assigned to the database table and the first invocation number, and wherein the sequence of pseudorandom numbers ends with a second pseudorandom number generated based on the seed value and the second invocation number; and
    retrieving, via entries of the data change index that are accessed using the sequence of pseudorandom numbers, the sequence of data changes made to the data values of the database table.

2. The method of claim 1, wherein all the invocation numbers ranging between the first invocation number and the second invocation number form a numerically ordered sequence; wherein the sequence of pseudorandom numbers form a numerically unordered sequence.

3. The method of claim 1, wherein a pseudorandom number in the sequence of pseudorandom numbers is used by a data change consumer to retrieve a respective data change in the sequence of data changes to the database table.

4. The method of claim 1, wherein the sequence of data changes are applied by one or more data change producers to the database table over time in a time sequential order corresponding to a numeric order of the invocation numbers ranging between the first invocation number and the second invocation number.

5. The method of claim 1, wherein each data change in the sequence of data changes corresponds to a respective invocation number in the invocation numbers ranging between the first invocation number and the second invocation number; wherein the data change is indexed based on a pseudorandom number generated based on the seed value and the respective invocation number.

6. The method of claim 1, wherein the database table comprises a plurality of table columns; wherein the plurality of table columns of the database table comprises an indexed table column used to store pseudorandom numbers.

7. The method of claim 1, wherein the sequence of data changes to the database table is retrieved by a data change consumer while the database table is concurrently accessed by at least one of a data change producer or another data change consumer.

8. One or more non-transitory computer readable media storing a program of instructions that is executable by a device to perform:
    detecting that a sequence of data changes was made to data values of a database table, wherein the sequence of data changes is indexed in a data change index based on pseudorandom numbers;
    determining a first invocation number and a second invocation number greater than the first invocation number;
    generating a sequence of pseudorandom numbers for all invocation numbers ranging between the first invocation number and the second invocation number, wherein the sequence of pseudorandom numbers begins with a first pseudorandom number generated based on a seed value assigned to the database table and the first invocation number, and wherein the sequence of pseudorandom numbers ends with a second pseudorandom number generated based on the seed value and the second invocation number; and
    retrieving, via entries of the data change index that are accessed using the sequence of pseudorandom numbers, the sequence of data changes made to the data values of the database table.

9. The media of claim 8, wherein all the invocation numbers ranging between the first invocation number and the second invocation number form a numerically ordered sequence; wherein the sequence of pseudorandom numbers form a numerically unordered sequence.

10. The media of claim 8, wherein a pseudorandom number in the sequence of pseudorandom numbers is used by a data change consumer to retrieve a respective data change in the sequence of data changes to the database table.

11. The media of claim 8, wherein the sequence of data changes are applied by one or more data change producers to the database table over time in a time sequential order corresponding to a numeric order of the invocation numbers ranging between the first invocation number and the second invocation number.

12. The media of claim 8, wherein each data change in the sequence of data changes corresponds to a respective invocation number in the invocation numbers ranging between the first invocation number and the second invocation number; wherein the data change is indexed based on a pseudorandom number generated based on the seed value and the respective invocation number.

13. The media of claim 8, wherein the database table comprises a plurality of table columns; wherein the plurality of table columns of the database table comprises an indexed table column used to store pseudorandom numbers.

14. The media of claim 8, wherein the sequence of data changes to the database table is retrieved by a data change consumer while the database table is concurrently accessed by at least one of a data change producer or another data change consumer.

15. A system, comprising:
one or more computing processors;
one or more non-transitory computer readable media storing a program of instructions that is executable by the one or more computing processors to perform:
detecting that a sequence of data changes was made to data values of a database table, wherein the sequence of data changes is indexed in a data change index based on pseudorandom numbers;
determining a first invocation number and a second invocation number greater than the first invocation number;
generating a sequence of pseudorandom numbers for all invocation numbers ranging between the first invocation number and the second invocation number, wherein the sequence of pseudorandom numbers begins with a first pseudorandom number generated based on a seed value assigned to the database table and the first invocation number, and wherein the sequence of pseudorandom numbers ends with a second pseudorandom number generated based on the seed value and the second invocation number; and
retrieving, via entries of the data change index that are accessed using the sequence of pseudorandom numbers, the sequence of data changes made to the data values of the database table.

16. The system of claim 15, wherein all the invocation numbers ranging between the first invocation number and the second invocation number form a numerically ordered sequence; wherein the sequence of pseudorandom numbers form a numerically unordered sequence.

17. The system of claim 15, wherein a pseudorandom number in the sequence of pseudorandom numbers is used by a data change consumer to retrieve a respective data change in the sequence of data changes to the database table.

18. The system of claim 15, wherein the sequence of data changes are applied by one or more data change producers to the database table over time in a time sequential order corresponding to a numeric order of the invocation numbers ranging between the first invocation number and the second invocation number.

19. The system of claim 15, wherein each data change in the sequence of data changes corresponds to a respective invocation number in the invocation numbers ranging between the first invocation number and the second invocation number; wherein the data change is indexed based on a pseudorandom number generated based on the seed value and the respective invocation number.

20. The system of claim 15, wherein the database table comprises a plurality of table columns; wherein the plurality of table columns of the database table comprises an indexed table column used to store pseudorandom numbers.

* * * * *